(12) United States Patent
Miyamoto et al.

(10) Patent No.: US 7,762,891 B2
(45) Date of Patent: Jul. 27, 2010

(54) GAME APPARATUS, RECORDING MEDIUM HAVING GAME PROGRAM RECORDED THEREON, AND GAME SYSTEM

(75) Inventors: Shigeru Miyamoto, Kyoto (JP); Hiroki Sotoike, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1269 days.

(21) Appl. No.: 10/715,415

(22) Filed: Nov. 19, 2003

(65) Prior Publication Data

US 2004/0229687 A1 Nov. 18, 2004

(30) Foreign Application Priority Data

May 12, 2003 (JP) .............................. 2003-132839

(51) Int. Cl.
*A63F 13/00* (2006.01)
(52) U.S. Cl. .............................. 463/31; 463/32; 463/33; 463/23
(58) Field of Classification Search .................. 463/40, 463/42, 1, 6, 31–33, 30
See application file for complete search history.

(56) References Cited

U.S. PATENT DOCUMENTS

| | | | | | |
|---|---|---|---|---|---|
| 5,393,073 | A | * | 2/1995 | Best ............................. | 463/35 |
| 5,863,248 | A | * | 1/1999 | Mine et al. ..................... | 463/4 |
| 6,126,547 | A | * | 10/2000 | Ishimoto ....................... | 463/42 |
| 6,238,291 | B1 | * | 5/2001 | Fujimoto et al. ............... | 463/44 |
| 6,431,982 | B2 | * | 8/2002 | Kobayashi .................... | 463/4 |
| 6,489,946 | B1 | | 12/2002 | Takeda et al. | |
| 6,497,618 | B1 | | 12/2002 | Nishiumi et al. | |
| 6,500,070 | B1 | * | 12/2002 | Tomizawa et al. ............. | 463/43 |
| 6,817,947 | B2 | * | 11/2004 | Tanskanen .................... | 463/41 |
| 7,115,031 | B2 | * | 10/2006 | Miyamoto et al. ............. | 463/1 |
| 2002/0013172 | A1 | * | 1/2002 | Kaku et al. .................... | 463/32 |

FOREIGN PATENT DOCUMENTS

| | | |
|---|---|---|
| JP | 11-267359 | 10/1999 |
| JP | 2000-334170 | 12/2000 |

OTHER PUBLICATIONS

Madden 2000 instruction book released Jul. 31, 1999, retrieved on Aug. 2, 2007, from http://downloads.planetmirror.com/pub/replacementdocs/Madden_2000_-_Manual_-_PSX.pdf.*

* cited by examiner

*Primary Examiner*—Ronald Laneau
*Assistant Examiner*—Ross A. Williams
(74) *Attorney, Agent, or Firm*—Nixon & Vanderhye P.C.

(57) ABSTRACT

A game system is composed of a TV, a hand-held game machine, and a game apparatus, for example. A hand-held game machine and a plurality of controllers are connected to the game apparatus, for example. The hand-held game machine displays a first game screen which indicates the positions of first to fourth characters in a game space. The TV displays second game screens which respectively correspond to second to fourth characters, each of the second game screens displaying only a limited extent of the game space. When a predetermined condition is satisfied, an operable character for a player is switched from a first character to a second character. Since different extents of game space are displayed for different characters, an interesting game can be provided.

21 Claims, 26 Drawing Sheets

DISPLAYED EXTENT WHEN SPECIAL ITEM IS OBTAINED

F I G. 3
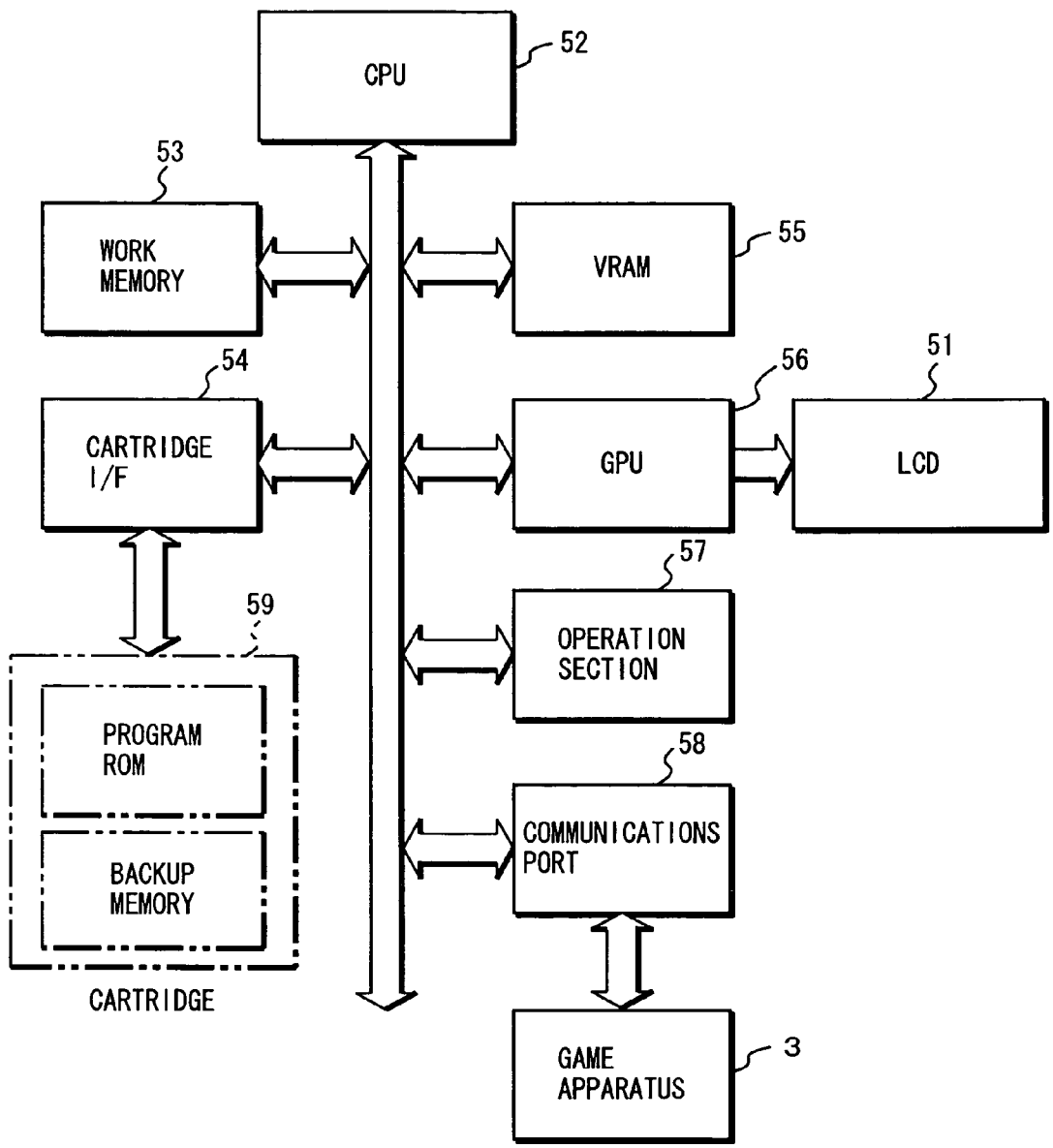

USUAL DISPLAYED EXTENT

DISPLAYED EXTENT WHEN SPECIAL
ITEM IS OBTAINED

F I G. 2 1 A
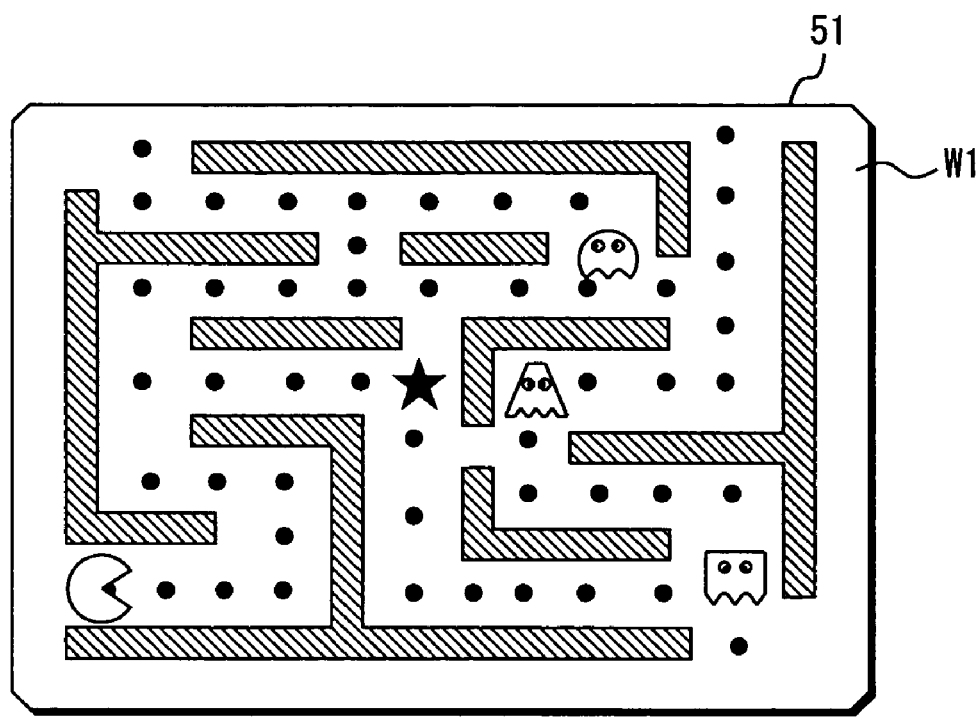
F I G. 2 1 B
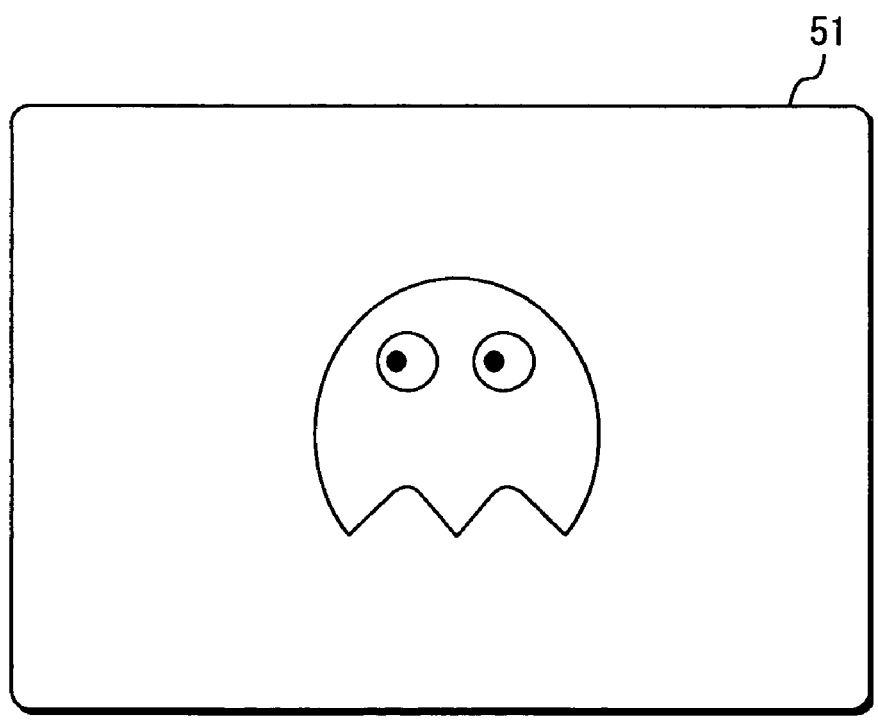

F I G. 2 4
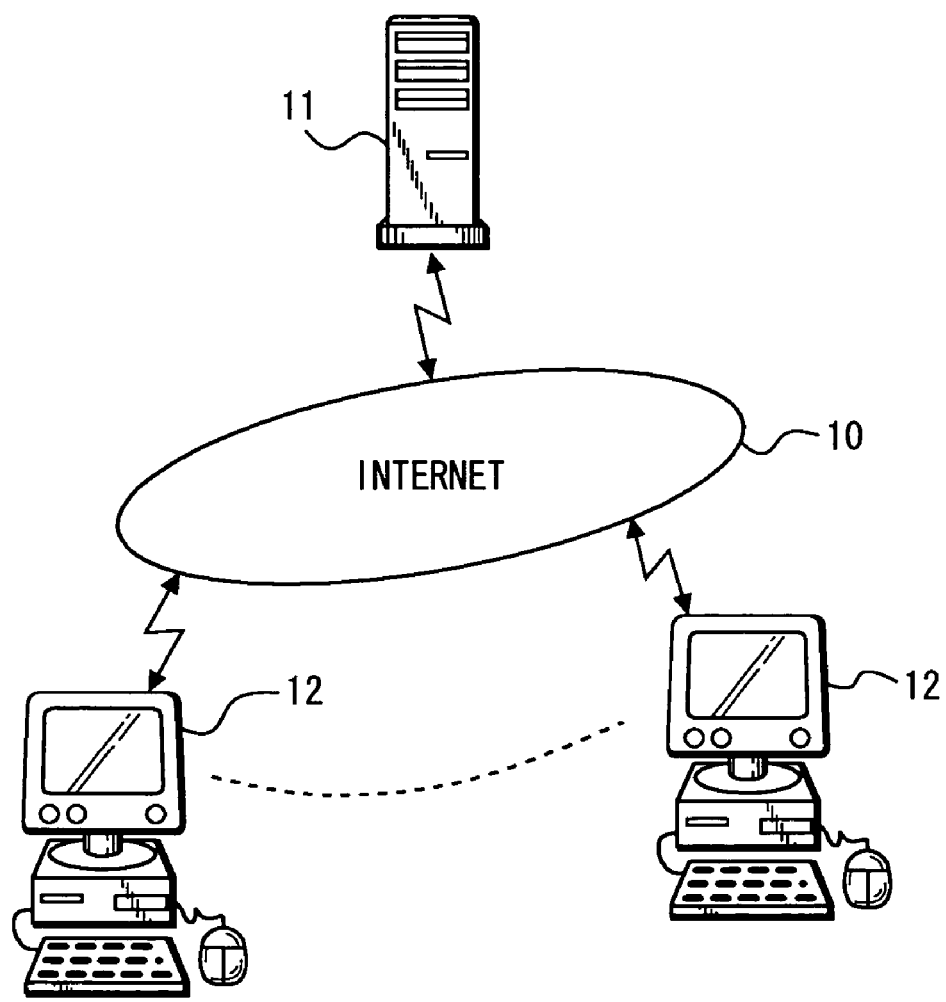

GAME APPARATUS, RECORDING MEDIUM HAVING GAME PROGRAM RECORDED THEREON, AND GAME SYSTEM

FIELD OF THE INVENTION

The illustrative embodiments relate to a game device, a game program, and a game system. More particularly, the illustrative embodiments relate to a game apparatus, a recording medium having a game program recorded thereon, and a game system, where the extent of a game space to be displayed changes depending on the character.

BACKGROUND AND SUMMARY OF THE INVENTION

Game devices exist which display a game screen presenting a part or a whole of a game space in a planar configuration, e.g., 2D (two-dimensional) games, or display a part of a game space in a three-dimensional configuration as seen from the viewpoint of a third person, e.g., 3D (three-dimensional) games. Some games which are played using such game screens progress by allowing a player to operate one of a plurality of kinds of characters. An example of such a game device is disclosed in Japanese Patent Gazette No. 2930237 (hereinafter referred to as the "first conventional technique").

In accordance with the game device of the first conventional technique, a player can arbitrarily operate either a first character or a second character. As is illustrated in FIGS. 4 and 5 of Japanese Patent Gazette No. 2930237, if the player operates the first character, a game screen is displayed as seen from the viewpoint of a third person located behind the first character; and if the player is to operate the second character, a game screen is displayed as seen from the viewpoint of a third person located behind the second character. Thus, regardless of which character is operated by the player, substantially the same range within the game space is displayed on the game screen. These characters are selectively used depending on the attributes of the characters within the game space (e.g., what sorts of items can be used, what sorts of magic can be used, or the speed with which each character can move), for example.

Japanese Patent Laid-Open Publication No. 2000-334170 teaches a game system in which a display device and a plurality of hand-held type game machines are coupled to a video game machine (hereinafter referred to as the "second conventional technique"). In accordance with the game system of the second conventional technique, as is illustrated in FIGS. 11 and 12 of Japanese Patent Laid-Open Publication No. 2000-334170, the display device displays a game screen representing the entire game space for all players to see, whereas each hand-held type game machine displays a narrower range of the game space which can only be seen by the player using that hand-held type game machine.

However, the above first and second conventional techniques have the following problems. In the case of the first conventional technique (where only one display device is employed), substantially the same range within the game space is displayed on the game screen regardless of which character is operated by the player; this makes it difficult to vary the playability for each character on the display screen. In the case of the second conventional technique (where a plurality of display devices are employed), a common game screen representing the entire game space is typically displayed on a display device which can be simultaneously viewed by all players, whereas a limited range of the game space around each character is typically displayed on a display device which is in the hands of, and therefore can only be viewed by, the player who is operating that character. In this case, since all players are allowed to view the same common screen, it is difficult to assign different levels of playability to the respective players. Thus, with the first and second conventional techniques, other than the attributes assigned to each character, it is difficult to assign a handicap to each player, e.g., depending on who the character or the player is.

Therefore, a feature of an illustrative embodiment is to provide a game device, a recording medium having a game program recorded thereon, and a game system, where a different level of playability can be assigned to each character on the basis of the game screen.

An illustrative embodiment comprises the following aspects to attain the feature mentioned above. (The reference numerals or the like indicated between parentheses are merely provided to help understand the illustrative embodiment in light of the embodiments to be described later, and are not of any limitative nature.)

One aspect of an illustrative embodiment is directed to a game device, having connected thereto an operation means (6, 5-8) with which a player operates a character (C1, C2), the game device outputting to display means (2, 51) a game screen containing at least one character which is operable with the operation means. The game device comprises a map storage means (4, 32, 53), character storage means (4, 32, 53), an operation detecting means (41, step S5 executed by the computer), a character switching means (42, S8), a first character operation controlling means (43a, S31), a first game screen output means (S95), a second character operation controlling means (43b, S32), and a second game screen output means (S23). The map storage means stores map data based on which to display a game space. The character storage means stores data of a first character and a second character which are operable by players. The operation detecting means detects an operation made to the operation means. The character switching means switches an operable character by the operation means when a predetermined condition is satisfied. As used herein, the "predetermined condition" corresponds to the first character being captured by another character in the following embodiment. Another example of the predetermined condition includes elapsing of a predetermined amount of time. When the character switching means selects the first character (C1) to be the operable character, the first character operation controlling means controls the first character in accordance with the operation made to the operation means. When the first character operation controlling means controls the first character, the first game screen output means outputs a first game screen (W1) representing a relatively broad extent of the game space containing the first character and the second character, based on the map data in the map storage means and the data in the character storage means. When the character switching means selects the second character (C2, etc.) to be the operable character, the second character operation controlling means controls the second character in accordance with the operation made to the operation means. When the second character operation controlling means controls the second character, the second game screen output means outputs a second game screen (W2, etc.) representing a relatively narrow extent of the game space containing the second character, based on the map data in the map storage means and the data in the character storage means.

Thus, in accordance with the above construction of an illustrative embodiment, different extents of game space are displayed depending on whether the first character or the second character is being operated, thus introducing different levels of controllability depending on the character. Specifically, when a relatively large extent of game space is being displayed, one can operate his or her character while predicting the motions of the enemies or the like whose positions are being displayed. In particular, if the entire game space is being displayed, one can efficiently move his or her character to a desired location. On the other hand, when only a limited extent of game space is being displayed, it becomes difficult to operate one's own character because of the inability to tell the positions of the hidden enemies, or to efficiently move one's character to a desired location because the entire game space is not being displayed. Since the operable character changes when a predetermined condition is satisfied, a game having an intriguingly complex system can be provided.

The operation means may comprise: a first operation means (5) to be used by a first player; and a second operation means (6) to be used by a second player distinct from the first player. The display means may comprise: first display means (51) for displaying a personal screen to be viewed by only one player; and second display means (2) for displaying a common screen to be viewed by all participating players. In this case, the character switching means switches the operable character for the first player and the operable character for the second player when the predetermined condition is satisfied. The first game screen output means outputs the first game screen to the first display means, and the second game screen output means outputs the second game screen to the second display means. Thus, by coupling a plurality of operation means, it becomes possible to realize a multi-player game. In the case where a plurality of players participate, characters can be operated in screens which provide different levels of controllability for different players, and the operable character for each player changes when a predetermined condition is satisfied, whereby an even more complex game can be provided. In one embodiment, the first operation means is a hand-held type game machine (5) including the first display means and a manipulable element with which to operate the first character. Thus, by utilizing a hand-held type game apparatus as the first operation means, it becomes easy to provide a personal screen which enables only one player to operate his or her character. Furthermore, the game device may comprise a plurality of second operation means (6-8) to be operated by a plurality of second players. In this case, the second game screen output means outputs (S27) to the second display means a plurality of second game screens for the respective second characters operable with the plurality of second operation means, the plurality of second game screens not overlapping one another. Thus, since a second game screen for the respective second characters operated by different players is displayed on a common display means, a more interesting game can be provided.

The game device may further comprise residual image displaying control means (45, C11) for displaying, after the first character has passed through the second game screen, a residual image along a trajectory of the first character for a predetermined period of time. Thus, after the first character has moved, a residual image is displayed along a trajectory of the first character for a predetermined period of time. As a result, even if the first character is no longer displayed in the second game screen, it is easily known that the first character has passed through the extent of game space which is displayed in the second game screen. In other words, it becomes easier to know the position of the first character in the entire game space, through the second game screen which only displays a narrow extent of game space.

The game device may further comprise a means for changing a display region in the second game screen (FIG. 11, S22), for a predetermined period of time after a certain condition is satisfied, so as to represent an extent of the game space which is broader than the more typical narrow view and encompasses the relatively narrow extent containing the second character. Thus, when a certain condition is satisfied (e.g., an item has been obtained or each time a predetermined period of time has elapsed), a broader extent of game space is displayed in the second game screen for the second character only. The broader extent of game space displayed lasts for a predetermined period of time, during which the game can be played to the player's advantage. The "broader extent of game space" as used herein is preferably an extent which is narrower than the broad extent displayed in the first game screen.

The game device may further comprise: a score storage means (32) including a first score storage area (32a) and a second score storage area (32b); a table generation/update means (S13, S53) for generating table data (TD) for making associations between the first score storage area, the first player, and the first player's operable character, for making associations between the second score storage area, the second player, and the second player's operable character, and for updating the associations when the character switching means switches the operable characters; score adding means (S43) for cumulatively adding points each time the first character scores points; and score writing means (S44) for writing the points added by the score adding means to the first score storage area, by referring to the table data, when the first player is associated with the first character, and writing the points added by the score adding means to the second score storage area, by referring to the table data, when the second player is associated with the first character. Thus, a plurality of score storage areas are provided corresponding to the respective players, whereby it becomes possible to add points to each individual player. Since points are added only while the player is operating the first character, a unique, interesting game can be provided, especially where a plurality of players participate, such that only the one player who is operating the first character can earn points.

The second game screen output means may output (S26) a radar screen (W5), for displaying only a position of the second character in the entire game space, to the second display means, the radar screen being displayed together with the second game screen in the second display means. Thus, when a plurality of second characters exist, the relative positions of second characters can be easily grasped based on the radar screen. For example, if the first character is contained within a second character's second game screen, it becomes possible to estimate the position of that second character based on the radar screen and to predict the first character's position, which is not displayed in the radar screen. Since the radar screen does not indicate the position of the first character, the fun of searching for the first character is not undermined.

A second feature of an illustrative embodiment is directed to a recording medium having a game program recorded thereon to be executed by a computer in a game device, having connected thereto operation means with which a player operates a character, the game program causing the game device to output to display means a game screen containing characters which are operable with the operation means. The recording medium, having a game program recorded thereon, causes the computer to function as a map storage means, character storage means, an operation detecting means, a character switching means, a first character operation controlling means, a first game screen output means, a second character operation controlling means, and a second game screen output means. The map storage means stores map data based on which to display a game space. The character storage means stores data of a player operable first and second character. The operation detecting means detects an operation made to the operation means. The character switching means switches an operable character, by using the operation means, once a predetermined condition is satisfied. When the character switching means selects the first character to be the operable character, the first character operation controlling means controls the first character in accordance with the operation made to the operation means. When the first character operation controlling means controls the first character, the first game screen output means outputs, based on the map data in the map storage means and the data in the character storage means, a first game screen representing a broad extent of the game space containing the first character and the second character. When the character switching means selects the second character to be the operable character, the second character operation controlling means controls the second character in accordance with the operation made to the operation means. When the second character operation controlling means controls the second character, the second game screen output means outputs, based on the map data in the map storage means and the data in the character storage means, a second game screen representing a narrow extent of the game space containing the second character.

The operation means may comprise: a first operation means to be used by a first player, and a second operation means to be used by a second player distinct from the first player; and the display means may comprise: first display means for displaying a personal screen to be viewed by only one player, and a second display means for displaying a common screen to be viewed by all participating players. In this case, the game program causes the computer to function so that: the character switching means switches the operable character for the first player and the operable character for the second player when the predetermined condition is satisfied; the first game screen output means outputs the first game screen to the first display means; and the second game screen output means outputs the second game screen to the second display means. Moreover, the first operation means may be a hand-held type game machine including the first display means and a manipulable element with which to operate the first character. In this case, the game program causes the computer to function so that the first game screen output means outputs the first game screen to the first display means of the hand-held type game machine. The game device may further comprise a plurality of second operation means to be operated by a plurality of second players. In this case, the game program causes the computer to function so that the second game screen output means outputs to the second display means a plurality of second game screens for the respective second characters operable with the plurality of second operation means, the plurality of second game screens not overlapping one another.

The game program may cause the computer to further function as residual image displaying control means for displaying, after the first character has passed through the second game screen, a residual image along a trajectory of the first character for a predetermined period of time.

The game program may cause the computer to further function as display region changing means for changing, for a predetermined period of time after a certain condition is satisfied, the second game screen so as to represent a broad extent of the game space which encompasses the narrow extent containing the second character.

The game program may cause the computer to further function as: a score storage means including a first score storage area and a second score storage area; a table generation/update means for generating table data for making associations between the first score storage area, the first player, and the first player's operable character, for making associations between the second score storage area, the second player, and the second player's operable character, and for updating the associations when the character switching means switches the operable characters; a score adding means for cumulatively adding points each time the first character scores points; and a score writing means for writing the points added by the score adding means to the first score storage area, by referring to the table data, when the first player is associated with the first character, and writing the points added by the score adding means to the second score storage area, by referring to the data, when the second player is associated with the first character.

The game program may cause the computer to function so that the second game screen output means outputs a radar screen for displaying, to the second display means, only a position of the second character in the entire game space, the radar screen being displayed together with the second game screen.

A third feature of an illustrative embodiment is directed to a game system for playing a network game comprising a plurality of terminal devices (12) coupled to a network, each terminal device including: an operation means, a map storage means, a character storage means, an operation detecting means, a character switching means, a first character operation controlling means, a first game screen output means, a second character operation controlling means, and a second game screen output means. The operation means is used by a player to operate a character. The map storage means stores map data based on which to display a game space. The character storage means stores data of a first character and a second character which are operable by players. The operation detecting means detects an operation made to the operation means. The character switching means switches an operable character by the operation means when a predetermined condition is satisfied. When the character switching means selects the first character to be the operable character, the first character operation controlling means controls the first character in accordance with the operation made to the operation means. When the first character operation controlling means controls the first character, the first game screen output means outputs, based on the map data in the map storage means and the data in the character storage means, a first game screen representing a relatively broad extent of the game space containing the first character and the second character. When the character switching means selects the second character to be the operable character, the second character operation controlling means controls the second character in accordance with the operation made to the operation means. When the second character operation controlling means controls the second character, the second game screen output means outputs, based on the map data in the map storage means and the data in the character storage means, a second game screen representing a relatively narrow extent of the game space containing the second character. The present game system may be constructed from the aforementioned game devices, being used as terminal devices.

Thus, in accordance with the above construction of the present invention, on the display device of each terminal device which can be viewed by one of a plurality of players operating respective second characters, only a narrow extent of game space containing the second character for that player is displayed, while a broader extent of game space is displayed on a terminal device's display device which can only be viewed by the one player who is operating the first character. As a result, handicaps can be introduced on the basis of displayed extents of game space. That is, whereas a player operating a second character can only recognize a partial game surrounding his or her own character, the player operating the first character can view a broader extent of game space, so that the player operating the first character can play the game to his or her advantage.

A fourth feature of an illustrative embodiment is directed to a game system comprising: at least one hand-held type game machine having a display section and an operation section operable by a player; a plurality of operation means which are operable by players; a game device for outputting a game screen in which to display characters which are operated within a game space respectively by means of the operation section of the hand-held type game machine and the plurality of operation means; and display means for displaying an image based on the output game screen. The game device includes a map storage means, a character storage means, an operation detecting means, a character switching means, a first character operation controlling means, a first game screen output means, a second character operation controlling means, and a second game screen output means. The map storage means stores map data based on which to display the game space. The character storage means stores data of a first character and a second character which are operable by players. The first character operation controlling means controls the first character in accordance with an operation made to the operation section of the hand-held type game machine. The second character operation controlling means controls the second character in accordance with an operation made to the operation means. The first game screen output means outputs a first game screen, to the hand-held type game machine, representing a broad extent of the game space containing at least the first character and the second character, based on the map data in the map storage means and the data in the character storage means. The second game screen output means outputs a second game screen to the display means, representing a narrow extent of the game space containing the second character, based on the map data in the map storage means and the data in the character storage means. The handheld type game machine displays the first game screen, which is output from the first game screen output means, on the display section. The display means displays the second game screen which is output from the second game screen output means.

Thus, in accordance with the above construction of the present invention, on a common display device which can be viewed by all of a plurality of players operating respective operation means, only a narrow extent of game space containing the character for each player is displayed, while a broader extent of game space is displayed on the display section serving as a personal screen which can only be viewed by the one player who is operating the hand-held type game machine. As a result, handicaps can be introduced on the basis of displayed extents of game space. That is, whereas a player operating the operation means can only view a partial game surrounding his or her own character, the player operating the hand-held type game machine can view a broader extent of game space, so that the player operating the hand-held type game machine can play the game to his or her advantage.

These and other objects, features, aspects and advantages of the illustrative embodiments will become more apparent from the following detailed description of the illustrative embodiments when taken in conjunction with the accompanying drawings.

BRIEF DESCRIPTION OF THE DRAWINGS

FIG. 3 is a block diagram illustrating a hand-held game machine;

FIG. 21A is a diagram illustrating an exemplary screen displayed on a hand-held game machine held by a player operating the first character;

FIG. 21B is a diagram illustrating an exemplary screen displayed on a hand-held game machine held by a player operating a character other than the first character;

FIG. 24 is a general view of a network game system which is constructed from a plurality of terminal devices which are connected via a network;

DESCRIPTION OF THE PREFERRED EMBODIMENTS

Hereinafter, a preferred embodiment of the illustrative embodiments will be described with reference to the figures.

Figure 1:
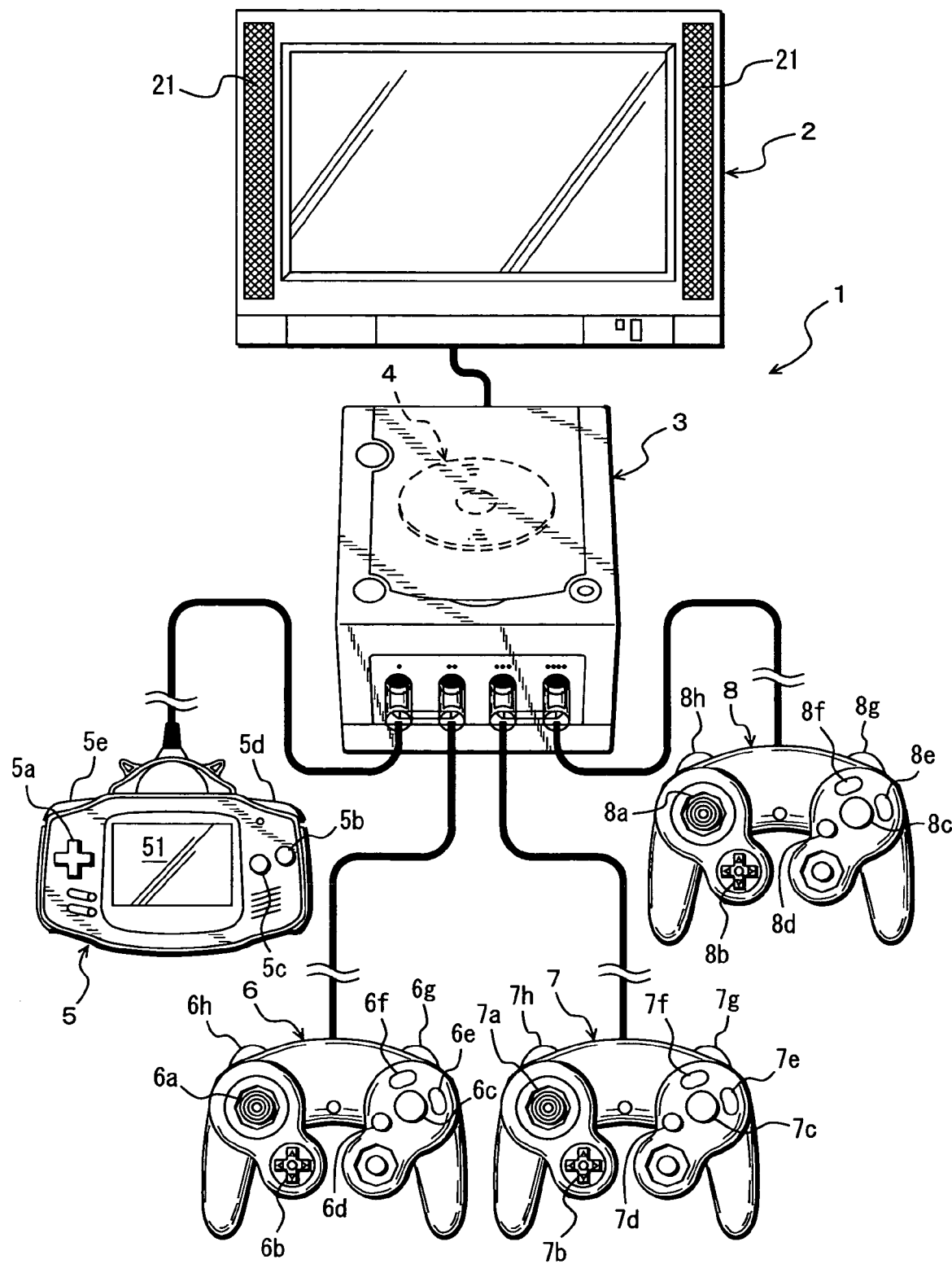
FIG. 1 is a general view of a game system according to the illustrative embodiments.

FIG. 1 is a general view of a game system device and a game system according to the present invention. The game system 1 comprises a television set 2 for home use (hereinafter referred to as the "TV 2") as an example of a second display means, and a video game device 3 (hereinafter referred to as the "game device 3") as an example of a game device. The TV 2 includes loudspeakers 21 for outputting background music or sound effects which are generated during a game. To the game device 3 are coupled: an optical disk 4 as an example of a recording medium having recorded thereon a game program for displaying game screens; a hand-held type game machine 5 (hereinafter referred to as the "hand-held game machine 5") as an example of an operation means; and controllers 6 to 8.

The hand-held game machine 5 includes an LCD (liquid crystal display) 51 as an example of a first display means and a display section, and an operation section composed of a plurality of manipulable elements, e.g., a cross key 5a, an A button 5b, a B button 5c, an R switch 5d, an L switch 5e, and the like. The functions of these manipulable elements can be appropriately determined by the game program. For example, the cross key 5a may be used to instruct a character to move in a certain direction within the game space, and the A button 5b may be used to instruct a character to jump in the game.

Each of the controllers 6 to 8 includes a set of manipulable elements similar to that of the hand-held game machine 5. Specifically, each of the controllers 6 to 8 includes an analog joystick (6a, 7a, or 8a), a cross switch (6b, 7b, or 8b), an A button (6c, 7c, or 8c), a B button (6d, 7d, or 8d), an X button (6e, 7e, or 8e), a Y button (6f, 7f, or 8f), an R switch (6g, 7g, or 8g), an L switch (6h, 7h, or 8h), a Z switch (not shown), and the like. When any of theses manipulable elements is operated by a player, key data corresponding to the type of manipulable element is generated. The functions to be assigned to such manipulable elements can be appropriately determined by the game program. For example, analog joysticks 6a to 8a and/or the cross switches 6b to 8b may be chiefly used for instructing a character to move in a certain direction within the game space. As in the present illustrative embodiment, in the case where both the hand-held game machine 5 and the controllers 6 to 8 are connected to the game device as operation means, it is preferable to assign the same function for the same type of manipulable element for operational consistency.

Figure 2:
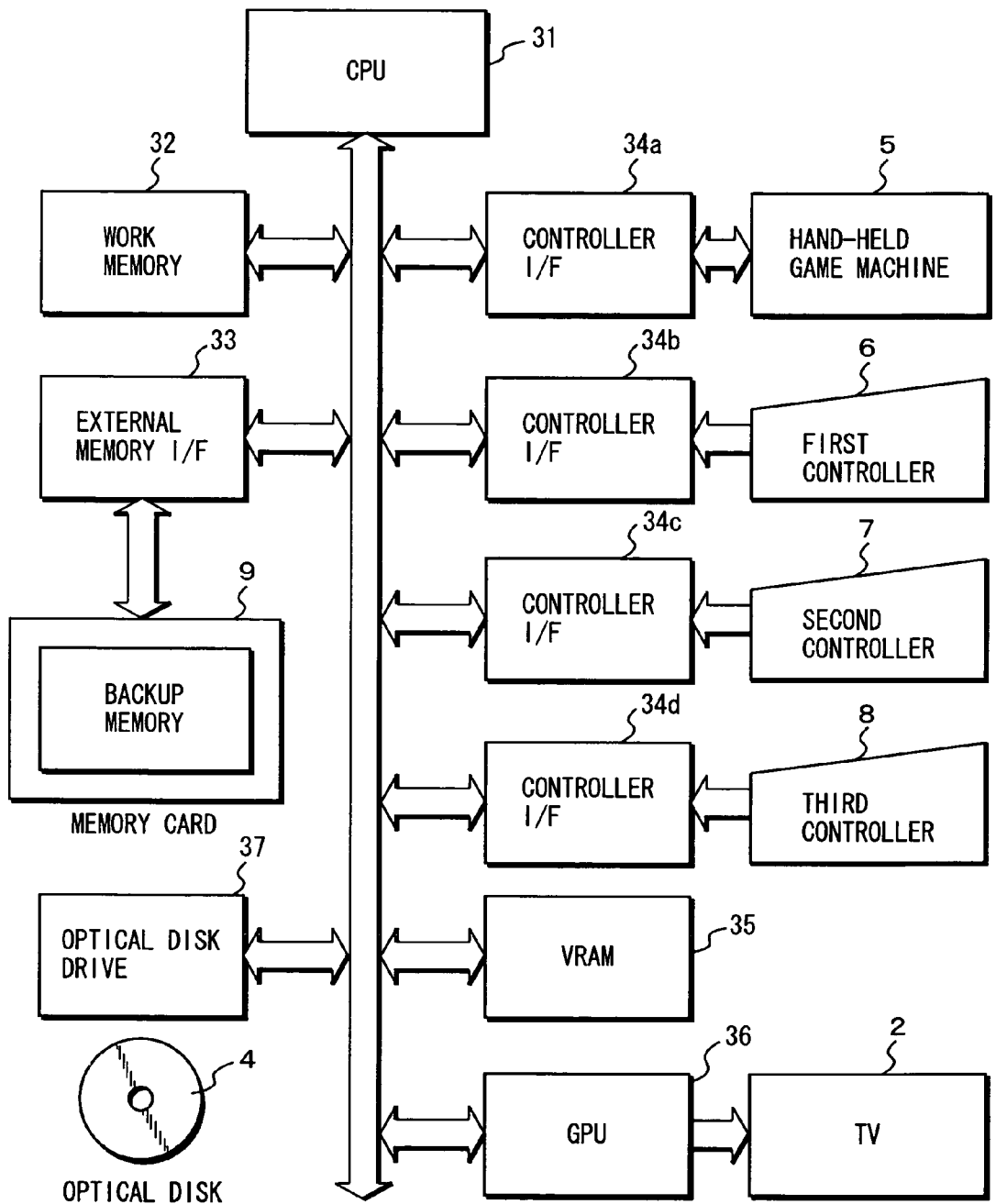
FIG. 2 is a block diagram illustrating a game device.

FIG. 2 is a block diagram illustrating a game device. As shown in FIG. 2, the game device 3 includes a computer, composed of a CPU 31 and other elements, which executes a game program which is recorded on the optical disk 4. A work memory 32, an external memory I/F 33, controller I/F's 34a to 34d, a VRAM 35, a GPU (Graphics Processing Unit) 36, an optical disk drive 37, and like elements are coupled to the CPU 31 via buses. The work memory 32, which is a memory for temporarily storing a game program to be executed by the CPU 31 and game data and the like, stores part or whole of a game program 40 (described later) as appropriate. The external memory I/F 33 is an interface for allowing a memory card 9 (on which backup data or the like can be stored) to be coupled. Each of the controller I/F's 34a to 34d is an interface comprising a buffer for storing key data which is generated by the manipulable elements on the hand-held game machine 5 or the controllers 6 to 8. Furthermore, the controller I/F's 34a to 34d can function as communications ports for enabling bi-directional communications with the hand-held game machine 5, or the like, shown in FIG. 1. In the present embodiment, a program for the hand-held game machine and coordinate data are to be transmitted to the hand-held game machine 5, and key data is to be received from the hand-held game machine 5. The VRAM 35 is a memory for storing an image to be displayed on the TV 2. The GPU 36 is a circuit which mainly performs graphic processing in accordance with instructions from the CPU 31, and converts the images stored in the VRAM 35 to a displayable data format for output to the TV 2. The optical disk drive 37 is a disk device for reading the game data recorded on the optical disk 4, such as the game program.

FIG. 3 is a block diagram illustrating the hand-held game machine 5. As shown in FIG. 3, the hand-held game machine 5 also includes a computer composed of a CPU 52 and other elements, as does the game device 3. A work memory 53, a cartridge I/F 54, a VRAM 55, a GPU 56, an operation section 57, a communications port 58, and like elements are coupled to the CPU 52 via buses. The work memory 53 stores a program for the hand-held game machine 5 which is sent from the game device 3 in a manner described later. As this program is executed by the CPU 52, a game screen is displayed on the LCD. The cartridge I/F 54 is an interface for mounting a cartridge 59, which is of no direct relevance to the embodiment. The VRAM 55 is a memory for generating an image to be displayed on the LCD 51. The GPU 56 is a circuit which mainly performs graphic processing in accordance with instructions from the CPU 52, and converts the images stored in the VRAM 55 to a displayable data format for output to the LCD 51. The operation section 57, which can be regarded as a controller comprising a plurality of manipulable elements such as the aforementioned cross key 5a, generates key data in accordance with each manipulable element. The communications port 58, which enables data communications with the game device 3, allows the aforementioned key data or the like to be exchanged therethrough.

Figure 4:
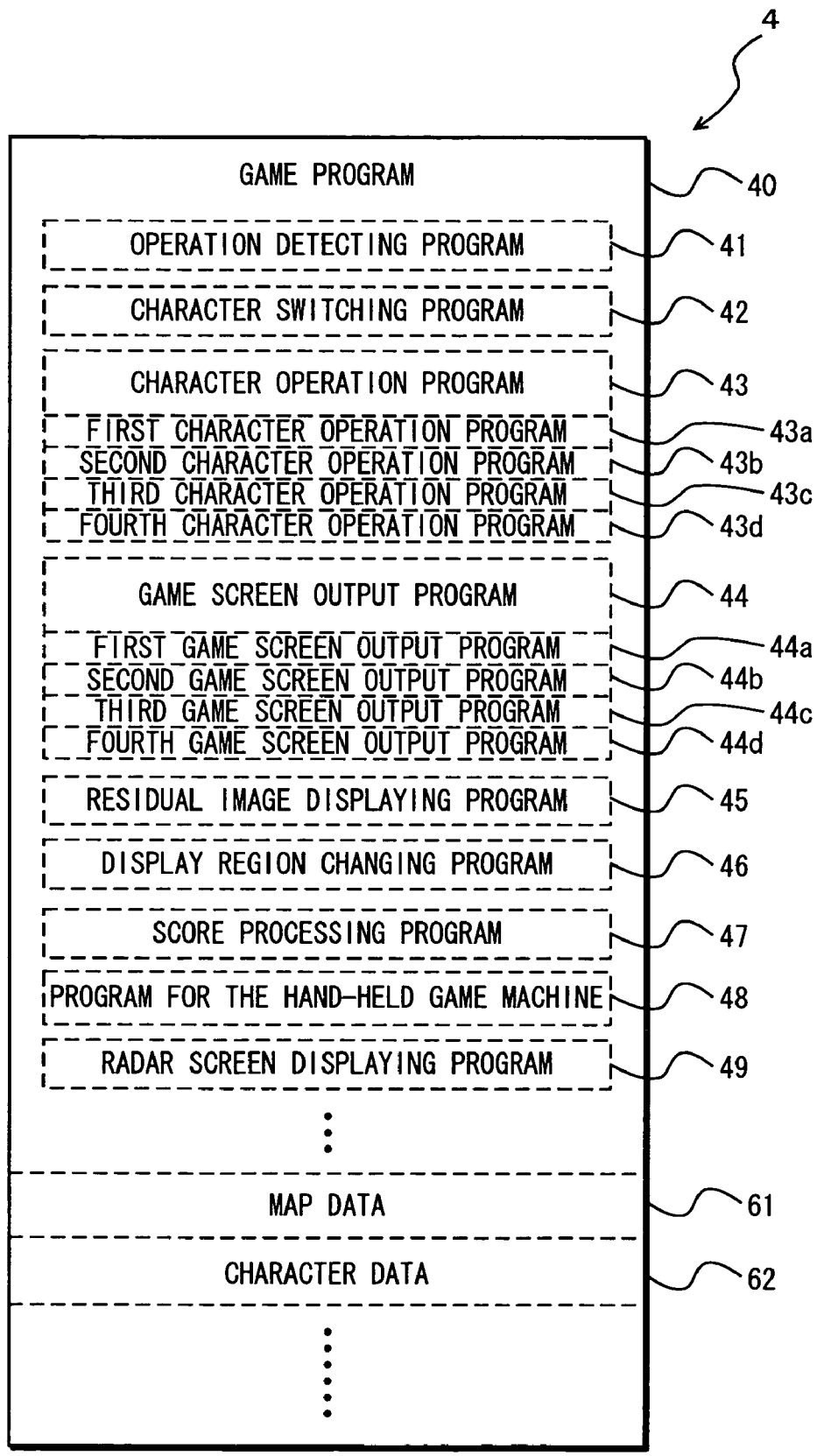
FIG. 4 is a chart showing a ROM image of a disk.

FIG. 4 is a chart showing a ROM image of the optical disk 4. As shown in FIG. 4, a game program 40, which is composed of instructions of a format executable by the computer of the game device 3 (in particular the CPU 31) and data, is recorded on the optical disk 4. The game program 40 is loaded into the work memory 32, as appropriate, for execution. Although the game program 40 or the like is recorded on the optical disk 4 in the present embodiment, the game program 40 or the like may be supplied via any other medium or a communication network.

The game program 40 maybe seen as comprising subprograms corresponding to the functions to be executed by the game device 3, e.g., an operation detecting program 41, a character switching program 42, a character operation program 43, a game screen output program 44, a residual image displaying program 45, a display region changing program 46, a score processing program 47, a program for the handheld game machine 48, and a radar screen displaying program 49, as well as map data 61 and character data 62, and the like.

The operation detecting program 41 is a program which detects which manipulable element has been operated in what way, by reading data from the buffers of the controller I/F's 34a to 34d. The character switching program 42 switches the operable character of each player. This switching includes swapping with an operable character of another player, or switching to a predetermined character.

Based on the key data detected by the operation detecting program 41, the character operation program 43 realizes movements of the characters and the like on the screen. Since the present embodiment will illustrate an example where four characters are operated by four players, the character operation program 43 includes a first character operation program 43a for controlling a first character C1, a second character operation program 43b for controlling a second character C2, a third character operation program 43c for controlling a third character C3, and a fourth character operation program 43d for controlling a fourth character C4, as will be described later with reference to FIGS. 9A and 9B.

The game screen output program 44 causes a game screen to be displayed on the TV 2 and the LCD 51. Since four players operate the four respective characters, the game screen output program 44 includes a first game screen output program 44a for displaying a first game screen W1 corresponding to the first character C1, a second game screen output program 44b for displaying a second game screen W2 corresponding to the second character C2, a third game screen output program 44c for displaying a third game screen W3 corresponding to the third character C3, and a fourth game screen output program 44d for displaying a fourth game screen W4 corresponding to the fourth character C4, thus displaying the four game screens as described later with reference to FIGS. 9A and 9B.

The residual image displaying program 45 causes a residual image C11 (see FIGS. 12A and 12B) to be displayed for a predetermined time after the first character C1 passes. The score processing program 47 is a program which, when the first character C1 obtains a point item (which only the first character C1 can obtain, as described later), enables the calculation of points in accordance with the obtained point item. The program for the hand-held game machine 48 is composed of instructions, and the like, which can be processed by the hand-held game machine 5, and when executed by the hand-held game machine 5, enable game processing based on transmission of key data and reception of coordinate data. The radar screen displaying program 49 causes a radar screen W5 to be displayed along with the second game screen W2, the third game screen W3, the fourth game screen W4, and the like, the radar screen W5 indicating the positions of characters other than the first character C1, i.e., the second to fourth characters C2 to C4, in the game space (e.g., the game map).

Figure 5A:
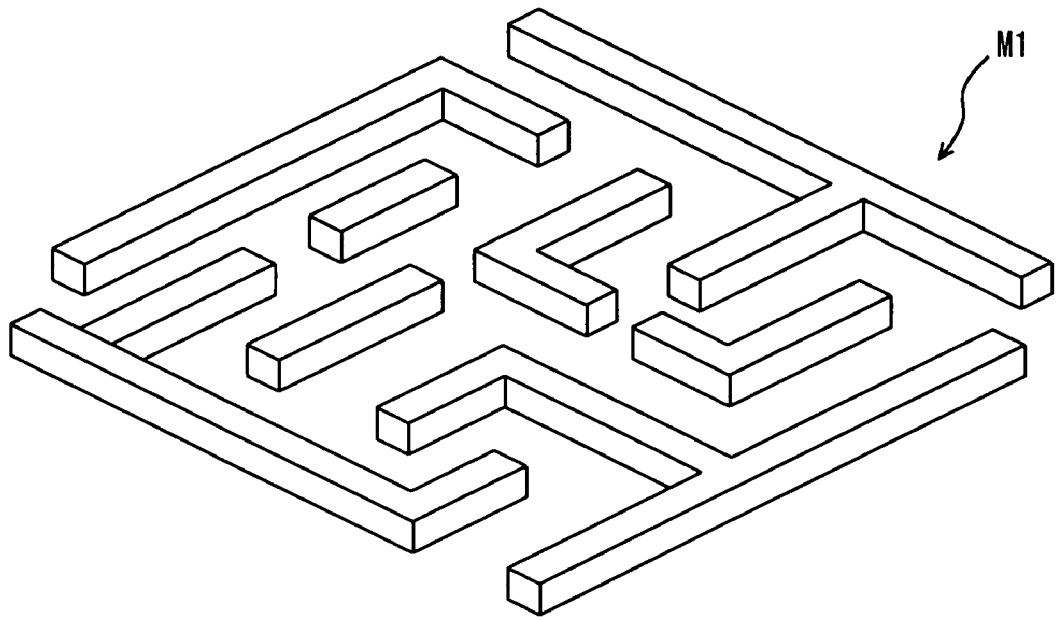
FIG. 5A is a conceptual diagram illustrating a three-dimensional map representing map data from which to generate a game space.
Figure 5B:
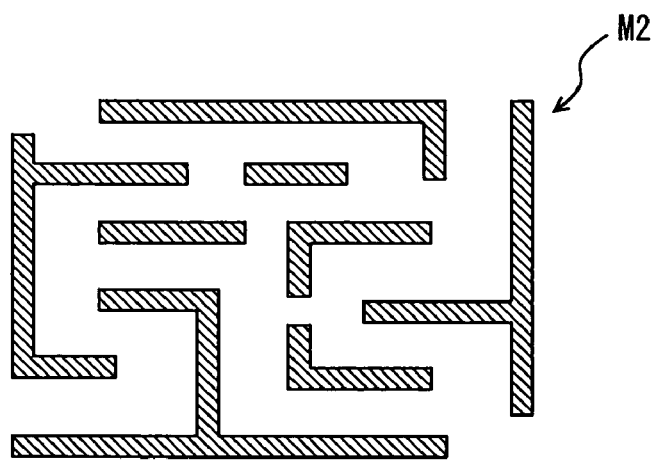
FIG. 5B is a conceptual diagram illustrating a two-dimensional map representing map data from which to generate a game space.
Figure 5C:
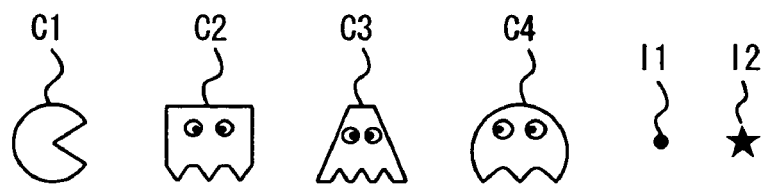
FIG. 5C is a diagram illustrating exemplary images of character data.

FIGS. 5A, 5B, and 5C are conceptual diagrams illustrating exemplary images representing the map data 61 and the character data 62 which together constitute the game space. The map data 61 is data used for allowing a game space to be displayed on the game screen, and may be, for example, a 3D map M1 (FIG. 5A) constituted by 3D coordinates, and a 2D map M2 (FIG. 5B) constituted by 2D coordinates. The character data 62 is data used for allowing characters to be displayed on the game screen, and includes the first character C1, the second character C2, the third character C3, the fourth character C4 (FIG. 5C), and so on. The character data 62 also includes, for example, a point item i1 which confers certain points to a player who obtains it and a special item I2 which, upon obtainment, expands the extent of the game space to be displayed (FIG. 5C). Although the data for the first to fourth characters may also include 2D data and 3D data (as is the case with the map data), such details are omitted from description or illustration in the present embodiment for the sake of simplicity.

Figure 6A:
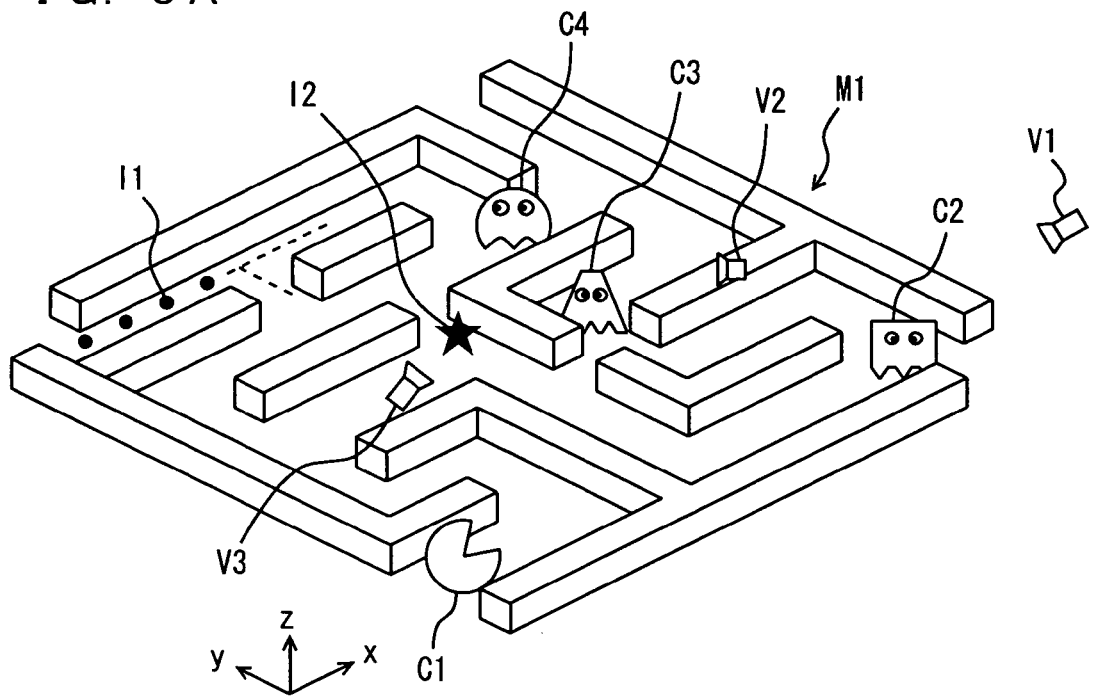
FIG. 6A is a diagram illustrating an exemplary image of a 3D game space.
Figure 6B:
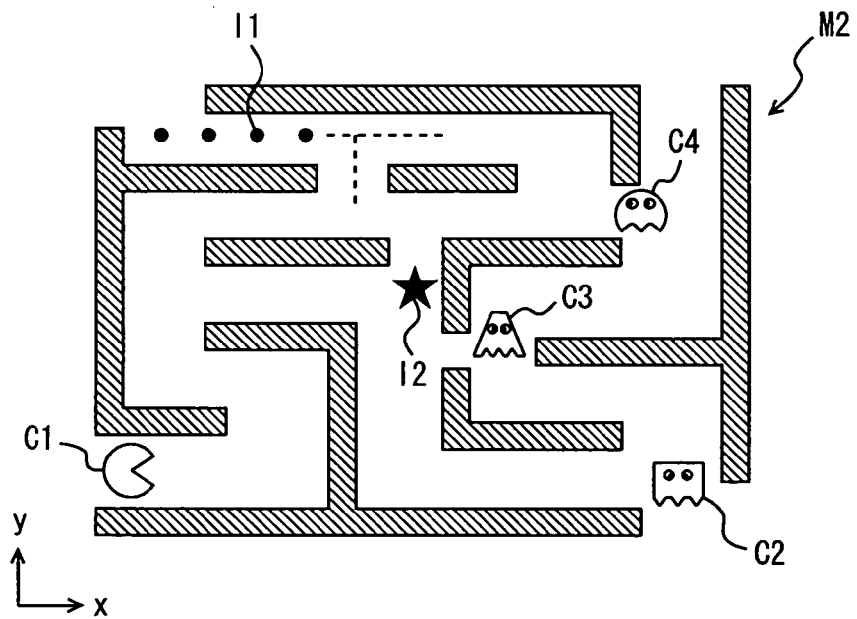
FIG. 6B is a diagram illustrating an exemplary image of a 2D game space.

FIGS. 6A and 6B are conceptual diagrams illustrating how a game space may be drawn. FIG. 6A is a diagram illustrating an exemplary image of a 3D game space composed of 3D data; and FIG. 6B is a diagram illustrating an exemplary image of a 2D game space composed of 2D data. The 2D game space is a mere planar projection of the 3D game space as seen from above, and any character would behave in the same manner in both game spaces; that is, the 3D and 2D game spaces are identical in effect. The present embodiment employs the 3D and 2D game spaces in order to display 3D images on a game screen dedicated to each character and to display 3D images on the game screen used to display the overall game space. Alternatively, in the case where both types of game screens are 2D only or 3D only, one of the 3D or 2D game spaces may be appropriately used.

The 3D game space shown in FIG. 6A is generated by executing the game program 40 while utilizing the data of the map M1 and the data of the first to fourth characters C1 to C4. The 2D game space shown in FIG. 6B is generated by executing the game program 40 while utilizing the data of the map M2. When generating a 3D game space, the map M1, which has been read from the optical disk 4 or the work memory 32, is placed on a 3D world coordinate system, and the first to fourth characters C1 to C4, similarly read from the optical disk 4 or the work memory 32, are deployed on the map M1. Then, a plurality of point items I1 are placed along passageways on the map M1, and a special item I2 is placed, for example, in the center of the map M1. Furthermore, in order to display game screens dedicated to the individual characters, a virtual camera V1 which follows the second character C2, a virtual camera V2 which follows the third character C3, and a virtual camera V3 which follows the fourth character C4 are placed in the 3D game space. As these virtual cameras V1 to V3 follow the respective characters, the behavior of each of the second to fourth characters C2 to C4 is displayed on an individual game screen (the second game screen W2, third game screen W3, or fourth game screen W4 as described later) on the TV 2. When generating a 2D game space, the map M2 is read, and the first to fourth characters C1 to C4 are deployed on the map M2. A game screen (the first game screen W1 described later) representing the entire map M2 is displayed on the LCD 51 of the hand-held game machine 5.

Figure 7A:
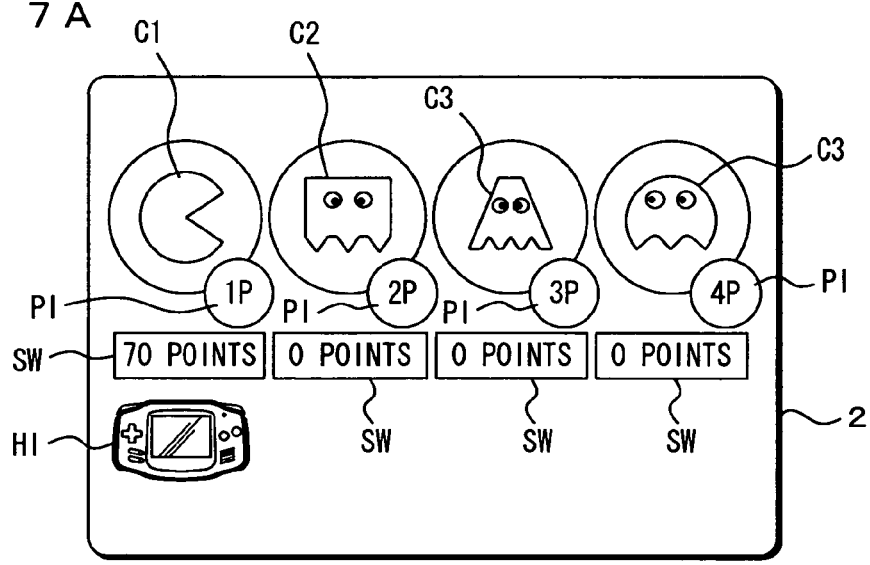
FIG. 7A is a diagram illustrating an exemplary screen on which character-player associations are indicated, the screen being displayed at the start of a game.
Figure 7B:
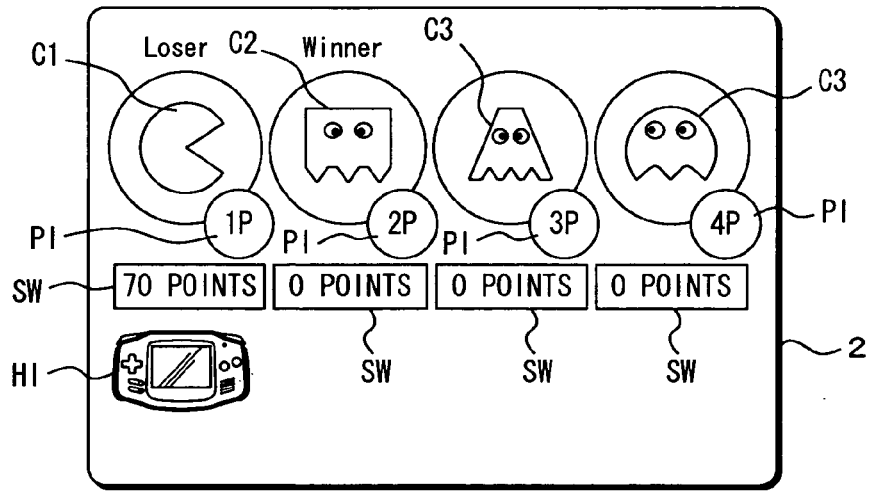
FIG. 7B is a diagram illustrating an exemplary screen on which character-player associations are indicated, the screen being displayed when a second player captures a first character.
Figure 7C:
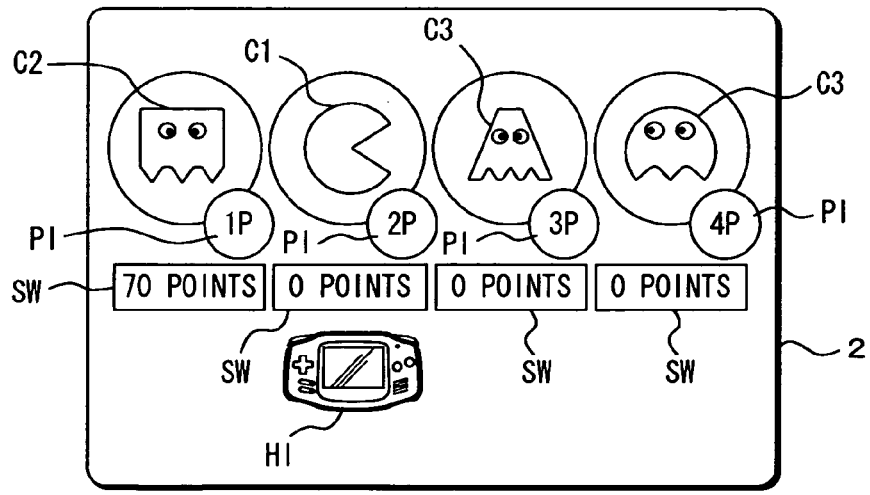
FIG. 7C is a diagram illustrating an exemplary screen on which character-player associations are indicated, the screen being displayed to allow switching of the player to operate the first character.
Figure 8A:
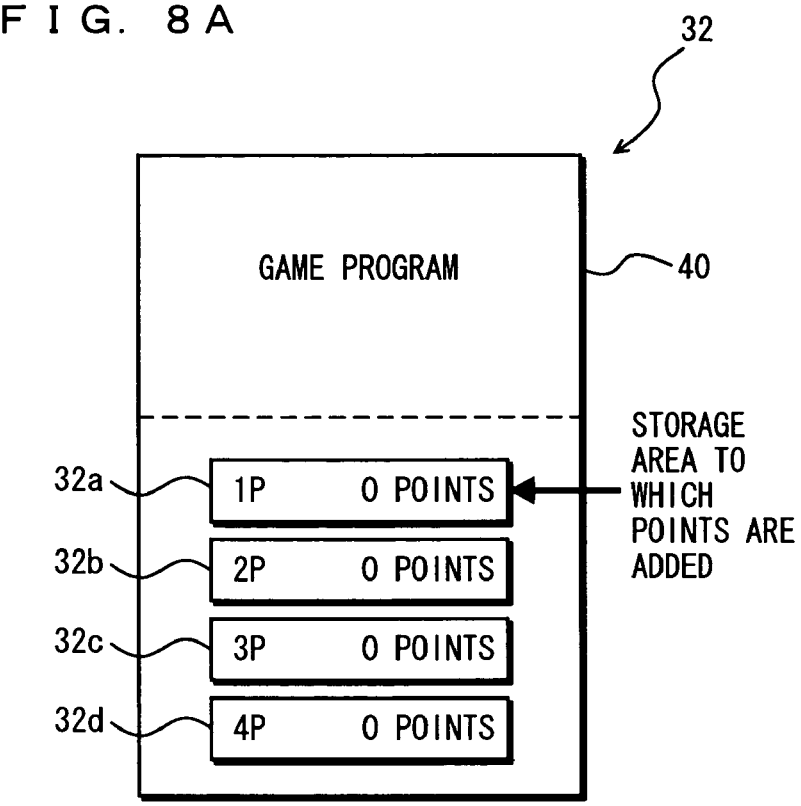
FIG. 8A is a chart illustrating score storage areas provided for respective players, where a first score storage area is selected as a storage area to which points are added.
Figure 8B:
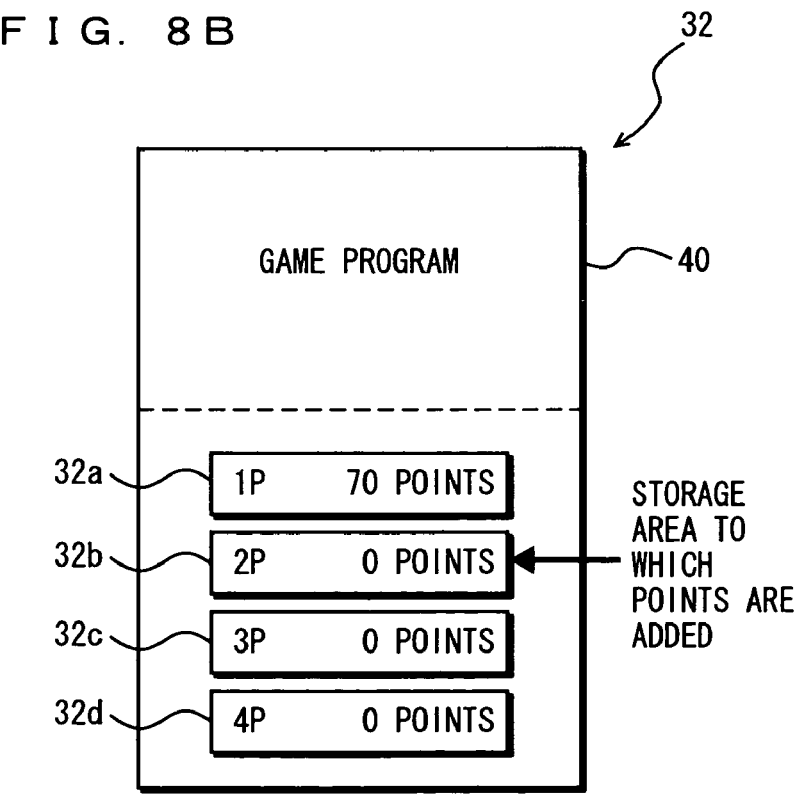
FIG. 8B is a chart illustrating score storage areas provided for respective players, where a second score storage area is selected as a storage area to which points are added.
Figure 9A:
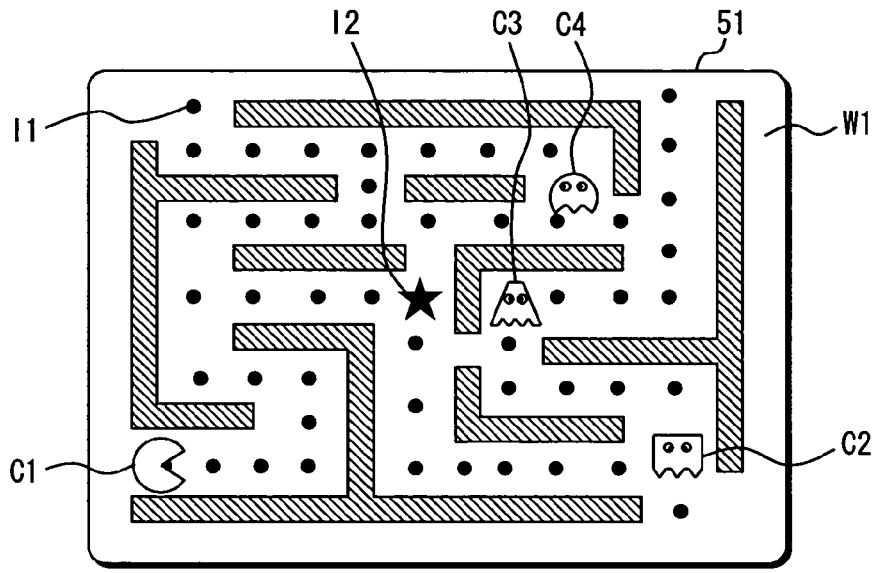
FIG. 9A is a diagram illustrating an exemplary first game screen.
Figure 9B:
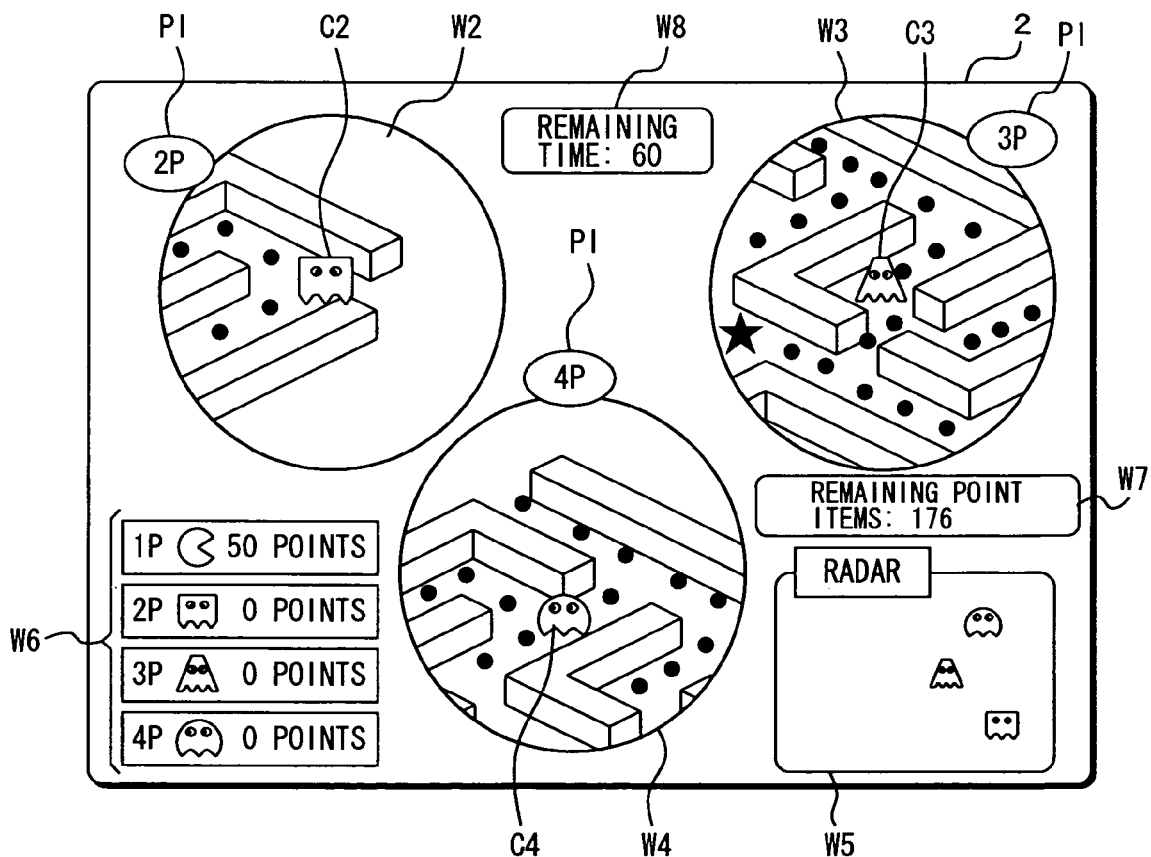
FIG. 9B is a diagram illustrating an exemplary second game screen.
Figure 10:
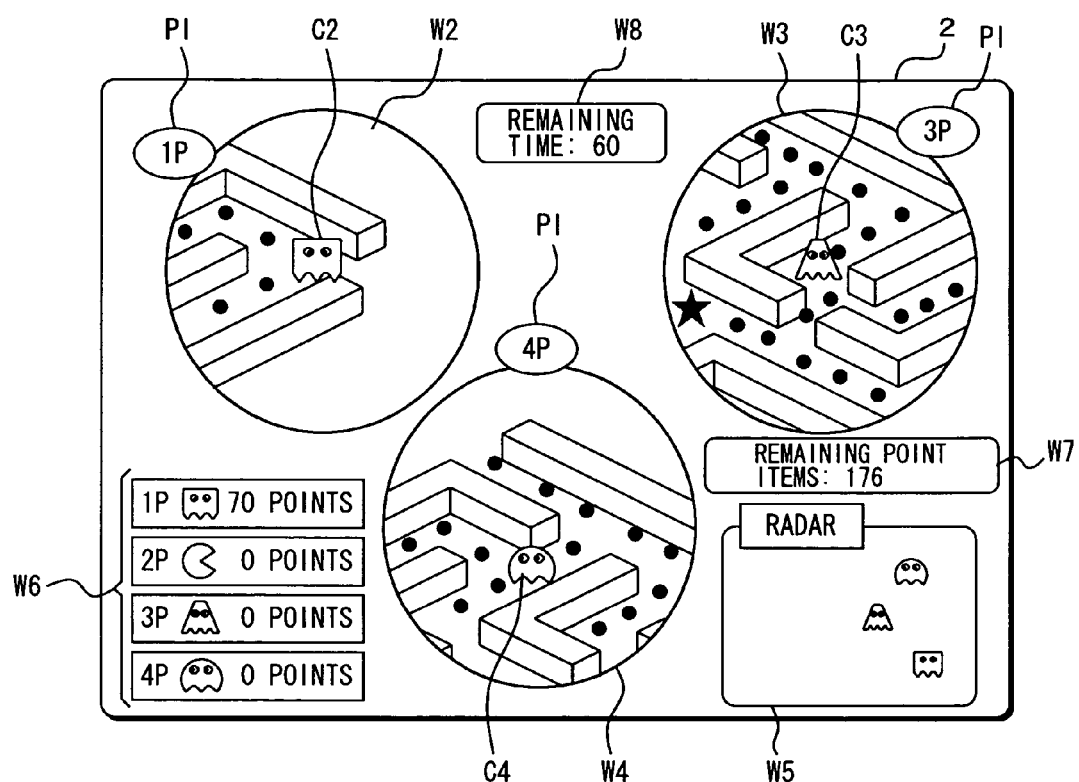
FIG. 10 is a diagram illustrating an exemplary second game screen displayed after switching of characters.
Figure 11A:
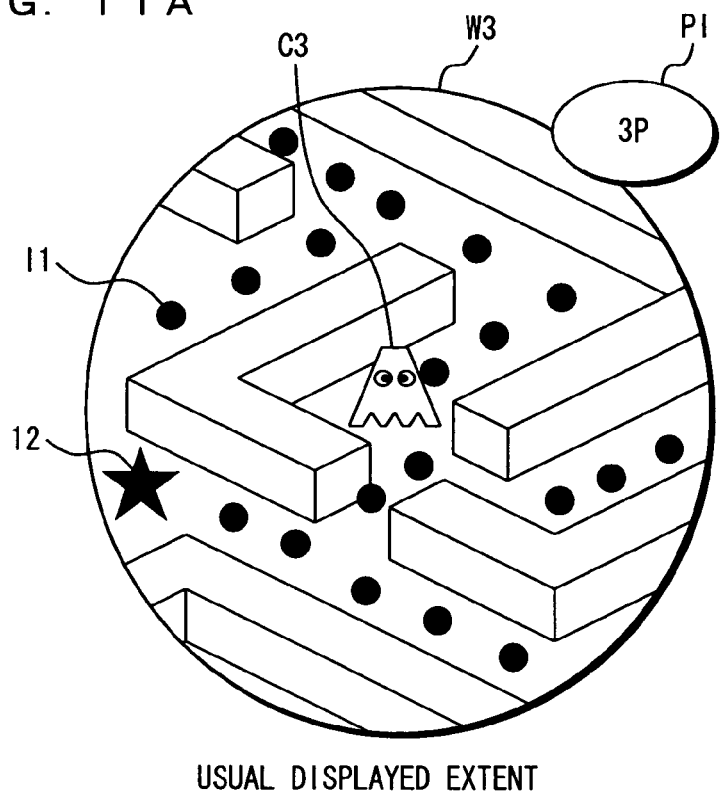
FIG. 11A is a diagram illustrating an exemplary second game screen showing a normal displayed extent.
Figure 11B:
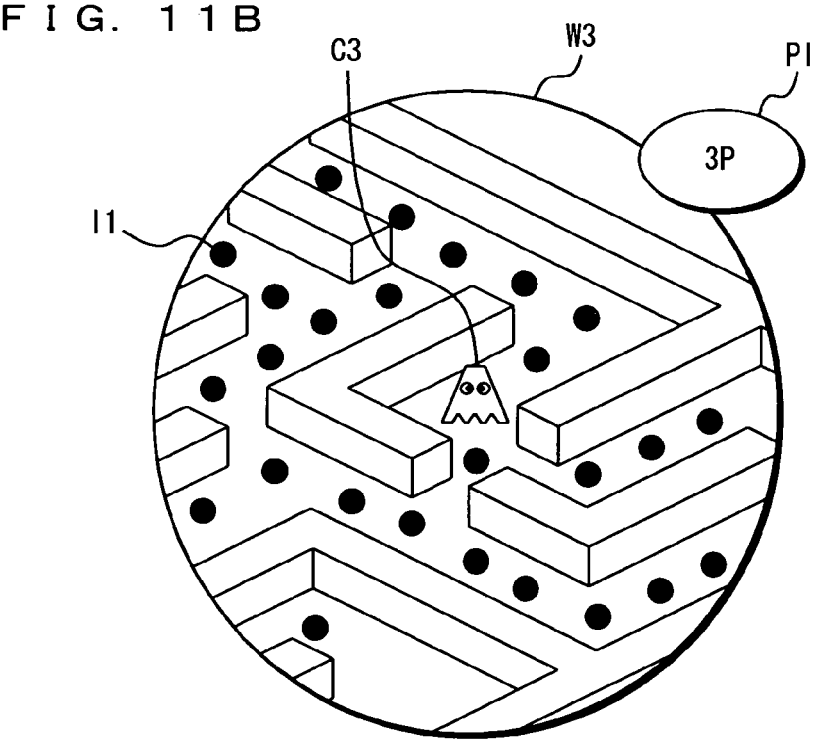
FIG. 11B is a diagram illustrating an exemplary second game screen showing a broadened displayed extent.
Figure 12A:
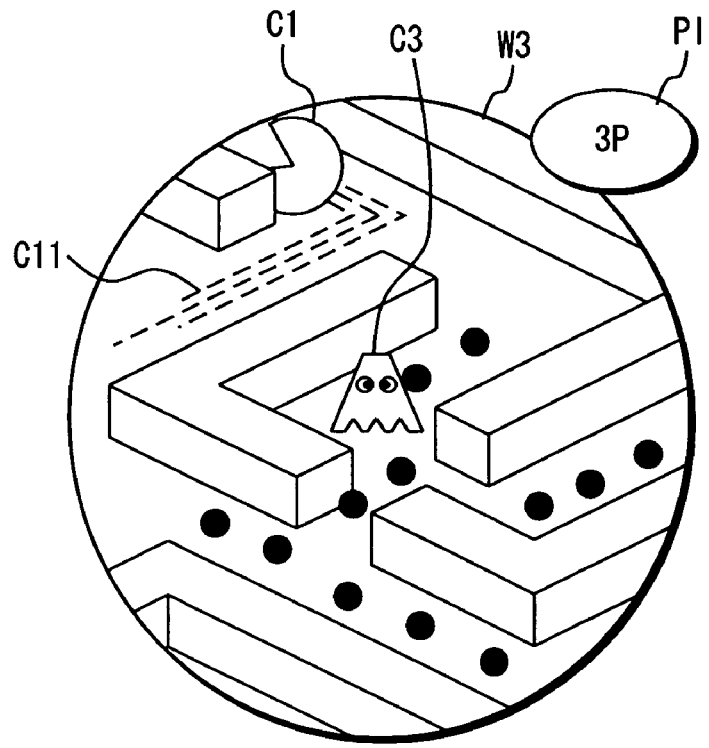
FIG. 12A is a diagram illustrating how the first character and its residual image may be displayed.
Figure 12B:
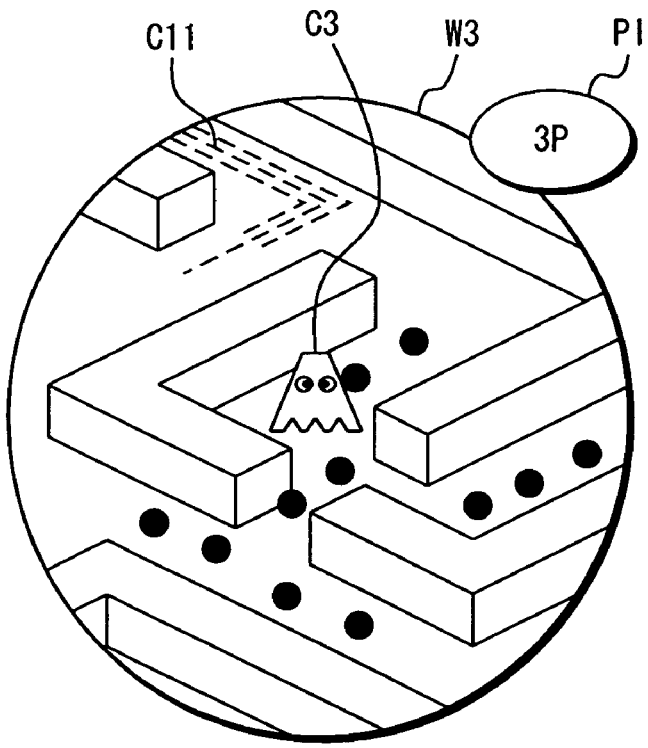
FIG. 12B is a diagram illustrating how only the residual image of the first character may be displayed.

Next, prior to describing a flowchart to be executed on a game device by game program according to the present illustrative embodiment, the outline of the illustrative embodiments and a game which is provided by the game device 3 executing the game program 41 will be described with reference to the exemplary game screens shown in FIGS. 7A, 7B, 7C, 8A, 8B, 9A, 9B, 10, 11A, 11B, 12A, and 12B, for ease of understanding. FIGS. 7A and 7B are diagrams illustrating an exemplary screen on which players and the character corresponding to the players are indicated. FIGS. 8A and 8B are charts illustrating score storage areas provided in the work memory 32. FIGS. 9A and 9B are diagrams illustrating an exemplary first game screen to be displayed on the LCD 51 of the hand-held game machine 5 (FIG. 9A) and an exemplary second game screen to be displayed on the TV 2 (FIG. 9B). FIG. 10 is a diagram illustrating an exemplary second game screen displayed on the TV 2 after switching of characters. FIGS. 11A and 11B are diagrams illustrating exemplary screens showing how an extent displayed in the second game screen is changed. FIGS. 12A and 12B are diagrams illustrating exemplary screens in which a residual image C11 of the first character C1 is displayed.

The primary principle of the illustrative embodiments lies in varying the extent of the game space to be displayed (hereinafter referred to as the "displayed extent") on each game screen when players switch the characters they operate. Specifically, while a first player operates a first character, a broad range of the game space (e.g., the entire game space) may be displayed as a first game screen, but while the first player operates any character (e.g., a second character) other than the first character, a relatively narrow range around the second character may be displayed as a second game screen.

According to the present illustrative embodiments, the first game screen is displayed on the hand-held game machine 5 held by the first player, and the second game screen is displayed on the TV 2, which can be viewed by not only the first player but also any other player (e.g., the second player). The rules of the game according to the present embodiment are such that the first character C1, which is originally operated by the first player and is the only character capable of obtaining points, is sought by the second to fourth characters C2 to C4 which are operated by second to fourth players, respectively, and any one of the second to fourth players who has captured the first character C1 becomes entitled to operate the first character C1 to obtain points.

More specifically, in a multi-player game in which a plurality of players play a game by operating respective game characters in competition with others, at least one player is entitled to operate the first character for pursuing points, while the other players are allowed to operate other characters. A broad map (i.e., the first game screen) is displayed on a display device of a single hand-held game machine, whereas narrow maps (i.e., the second game screens) are displayed on a display device associated with the game device. The player who happens to be operating the first character pursues point-conferring objects (point items) to obtain points by moving the first character on the broad map which is displayed on the display device of the hand-held game machine. Meanwhile, the other players operate their respective (second to fourth) characters to seek the first character, and when any player captures the first character, that player switches with the player operating the first character, and thus becomes entitled to operate the first character to pursue points thereafter. In the memory, registers for counting points are provided corresponding to the respective players. Depending on how the first character is operated, points are given to the player who is operating the first character, so that a counter corresponding to that player counts the points. At the end of the game (as defined by the lapse of a predetermined time, etc.), the performances of the players are determined based on the points which have been counted by the counters corresponding to the respective players. The principle of the present game system can be applied not only to a combination of a hand-held game machine and a stationary game machine (a video game device), but also to: a multi-player game to be played on a single video game device; a multi-player game to be played on a plurality of video game devices which are coupled via a network; and a network game to be played on a plurality of terminal devices (e.g., personal computers) which are coupled via the Internet. In the case where the game is to be played on a single video game device, the game can be realized by switching between the first game screen and the second game screen on a single display device. In the case where the game is to be played on a plurality of terminal devices or video game devices, at least one of the terminal devices or video game devices displays the first character on a broad map, and a condition is provided which allows the player, to whom the first character is displayed, to obtain points. The players on the other terminal devices or video game devices, to whom other characters are displayed, operate the other characters, to seek the first character to become entitled to operate the first character.

In accordance with the configuration of the present embodiment, the player operating the first character C1 alone can view the entire game space and the positions of the respective characters by means of the hand-held game machine 5 in his or her hands, whereas the other players can only view partial game spaces as assigned to the second to fourth characters C2 to C4 displayed on the TV 2. Thus, handicaps are given to the second to fourth characters C2 to C4 relative to the first character C1, whereby a certain game balance is attained. Hereinafter, the present embodiment will be specifically described with reference to FIG. 7A and the subsequent figures.

FIG. 7A shows an exemplary image to be displayed on the TV 2 at the start of a game. This image, which indicates associations between a plurality of players and a plurality of characters, contains the first to fourth characters C1 to C4, four player icons PI, four score windows SW, and one hand-held icon HI. The player icons PI are icons respectively defining the four players as the first to fourth players; the "1P" icon represents the first player; the "2P" icon represents the second player; the "3P" icon represents the third player; and the "4P" icon represents the fourth player. Each score window SW indicates how many points have been scored by the respective player. The hand-held icon HI, which is a caricature of the hand-held game machine 5, dictates which player is to hold the hand-held game machine 5 in his or her hands. The displayed order of the first to fourth characters C1 to C4 corresponds to the order of the hand-held game machine 5 and the controllers 6 to 8 as connected to the game device 3. Therefore, in an initial state as shown in FIG. 7A, the hand-held game machine 5 for controlling the first character C1 is to be operated by the first player; the controller 6 for controlling the second character C2 is to be operated by the second player; the controller 7 for controlling the third character C3 is to be operated by the third player; and the controller 8 for controlling the fourth character C4 is to be operated by the fourth player.

At this time, a score storage area for cumulatively storing points to be obtained by the first character C1 is set within the work memory 32. Specifically, as shown in FIG. 8A, a first score storage area 32a for the first player, a second score storage area 32b for the second player, a third score storage area 32c for the third player, and a fourth score storage area 32d for the fourth player are set in the work memory 32. Furthermore, the first score storage area 32a for the first player operating the first character C1 is selected as a storage area to which points are added.

Then, the first and second game screens as shown in FIGS. 9A and 9B are displayed on the LCD 51 and the TV 2, respectively. FIG. 9A shows the first game screen W1 to be displayed on the LCD 51 of the hand-held game machine 5. In the first game screen W1, the entirety of the game space illustrated in FIG. 6B is shown. Thus, the first player can operate the first character C1 while viewing the first game screen W1 in which all characters can be located. The first player will pursue point items I1 while avoiding the second to fourth characters C2 to C4, which are the enemies seeking the first character C1.

On the other hand, as shown in FIG. 9B, a second game screen W2 with the "2P" player icon PI, a third game screen W3 with the "3P" player icon PI, a fourth game screen W4 with the "4P" player icon PI, the radar screen W5, score windows W6, a remaining point items window W7, and a remaining time window W8 are displayed on the TV 2. The score windows W6 display the total points scored by the respective players. The remaining point items window W7 displays the remaining number of point items P1, which decrease as they are obtained by the first character C1. The remaining time window W8 displays a remaining time until the game ends; the example shown in FIG. 9B indicates that there are 60 seconds until the game ends.

Each of the second to fourth game screens W2 to W4 displays a narrow partial game space around each character, as viewed by a corresponding one of the virtual cameras V1 to V3. The radar screen W5 displays the positions of the characters in the game space. The second to fourth players look for the first character C1, while viewing their own limited game screens and taking into consideration the positions of their own characters, and operate the respective second to fourth characters C2 to C4 in an effort to capture the first character C1. Points are earned as the first character C1 passes over any point item I1. If any of the characters other than the first character C1 (i.e., the second to fourth characters C2 to C4) comes in contact with the first character C1, a process describing the capture of the first character C1 by that character is performed.

Then, when the second player has captured the first character C1, for example, the game may come to a break, and the screen as shown in FIG. 7B may be displayed on the TV 2. In this screen, the first character C1 is labeled as "Loser", and the second character C2, which has captured the first character C1, is labeled as "Winner". The screen of FIG. 7B, which is displayed when the first character C1 has been captured by another player, e.g., the second character C2, allows the first player to switch the character for him or her to operate; in other words, this screen allows for the switching of the players to operate the first character C1. Then, a screen as shown in FIG. 7C is further displayed to indicate that the operable character for the first player should now be the second character C2, and the operable character for the second player should now be the first character C1. In the screen of FIG. 7C, the hand-held icon HI is now displayed so as to point to the second player, thus prompting the first and second players to switch the hand-held game machine 5 and the first controller 6 between them. At this time, as shown in FIG. 8B, the second score storage area 32b for the second player is selected as the storage area to which points are added. Thereafter, the first player operates the second character C2 with the controller 6, and the second player operates the first character C1 with the hand-held game machine 5. As a result, the points scored by the first character C1 are cumulatively stored to the second score storage area 32b. At this time, a game screen as shown in FIG. 10 is displayed on the TV 2, where the player icon PI associated with the second game screen W2 has been changed from "2P" to "1P", so that the first player now operates the second character C2 by watching the second game screen W2. The game progress while involving such switching of characters.

Moreover, as shown in FIGS. 11A and 11B, if any one of the second character C2, the third character C3, or the fourth character C4 obtains the special item I2, the extent of game space displayed for that character may change. FIGS. 11A and 11B illustrate an example where the displayed extent of the third game screen W3 is changed. If the third character C3 obtains the special item I2 in the third game screen W3 as shown in FIG. 11A, the extent of game space displayed in the third game screen W3 is enlarged as shown in FIG. 11B, so that a broader range of the game space can be viewed. This can by realized by, for example, pulling back the virtual camera V3 for the second character C2. Although the present embodiment illustrates an example of displaying a broader extent of game space by reducing the displaying scale of the game space without changing the size of the third game screen W3 itself, it may also be possible to simply increase the size of the third game screen W3 to display a broader extent of game space.

Furthermore, as shown in FIG. 12A, after the first character C1 has passed through the partial game space shown in the third game screen W3, a residual image C11 may be displayed along the trajectory of the first character C1 for a predetermined period of time. As further shown in FIG. 12B, even if the first character C1 itself is not entirely contained within the third game screen W3, the residual image C11 may be left for a predetermined period of time. As a result, even if the player cannot directly see the first character C1, the player can still know in which direction the first character C1 has moved, etc., based on the residual image C11.

Figure 13:
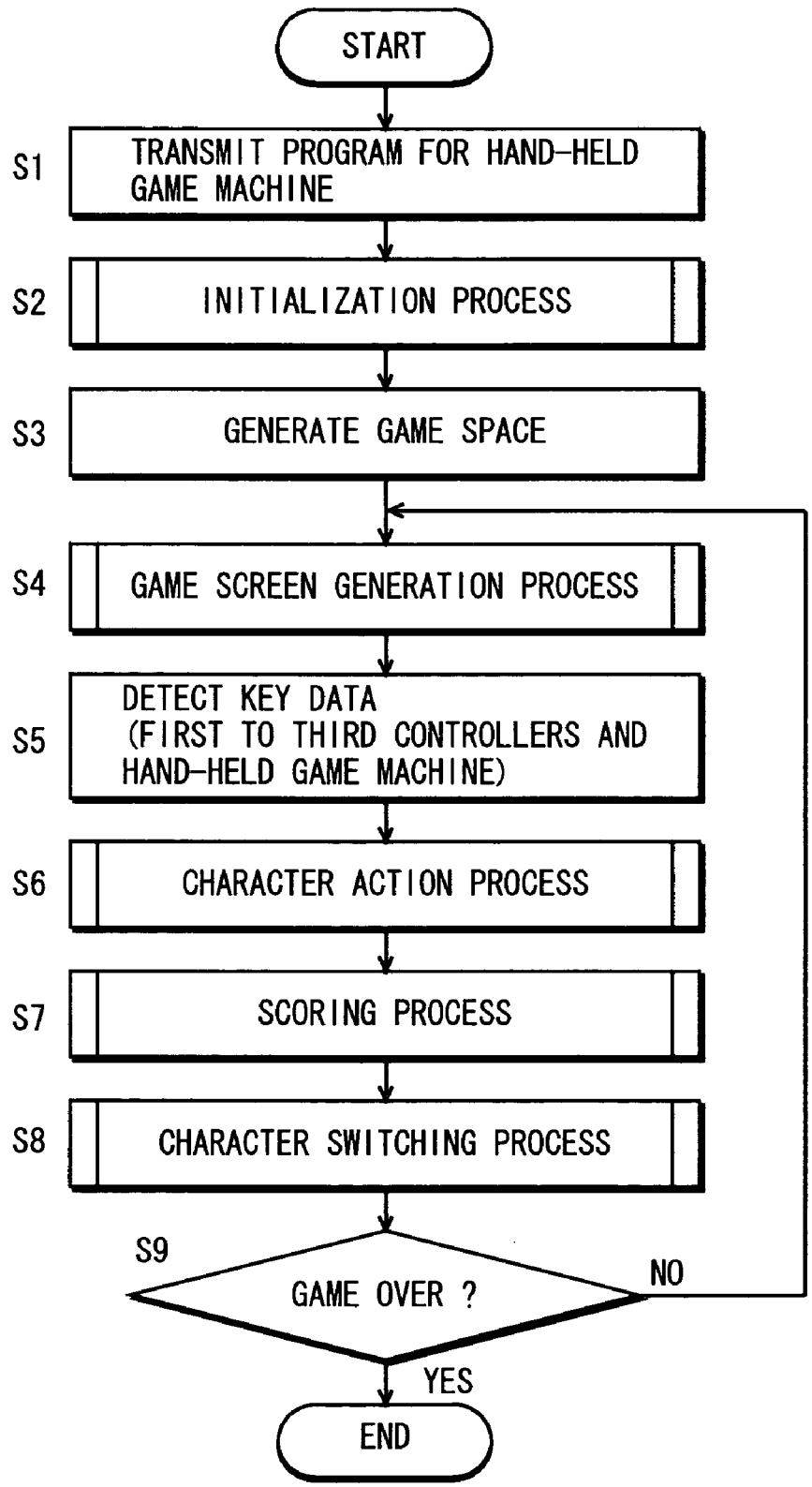
FIG. 13 is a flowchart illustrating a process which is performed in the game device.
Figure 14:
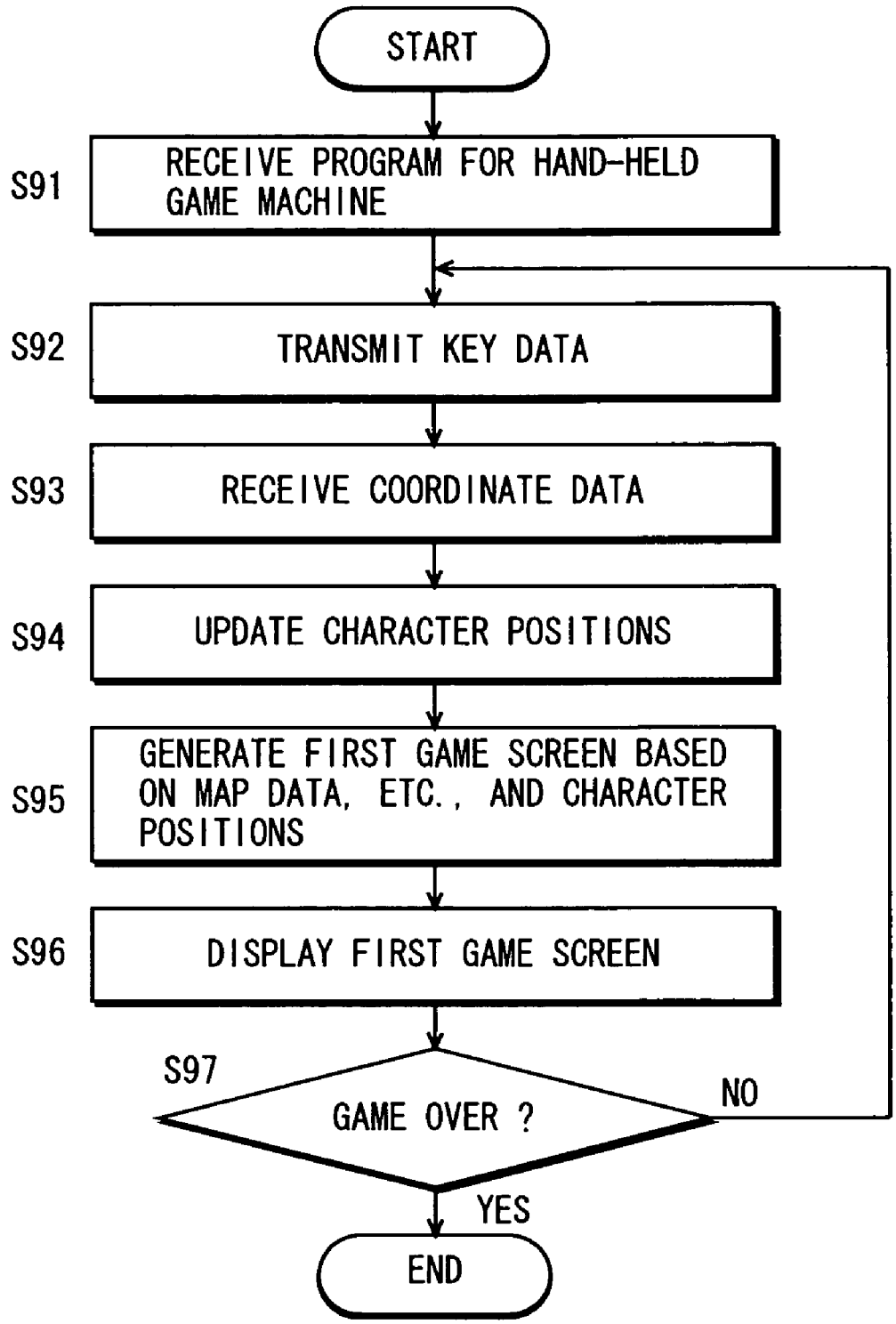
FIG. 14 is a flowchart illustrating a process which is performed in the hand-held game machine.
Figure 15:
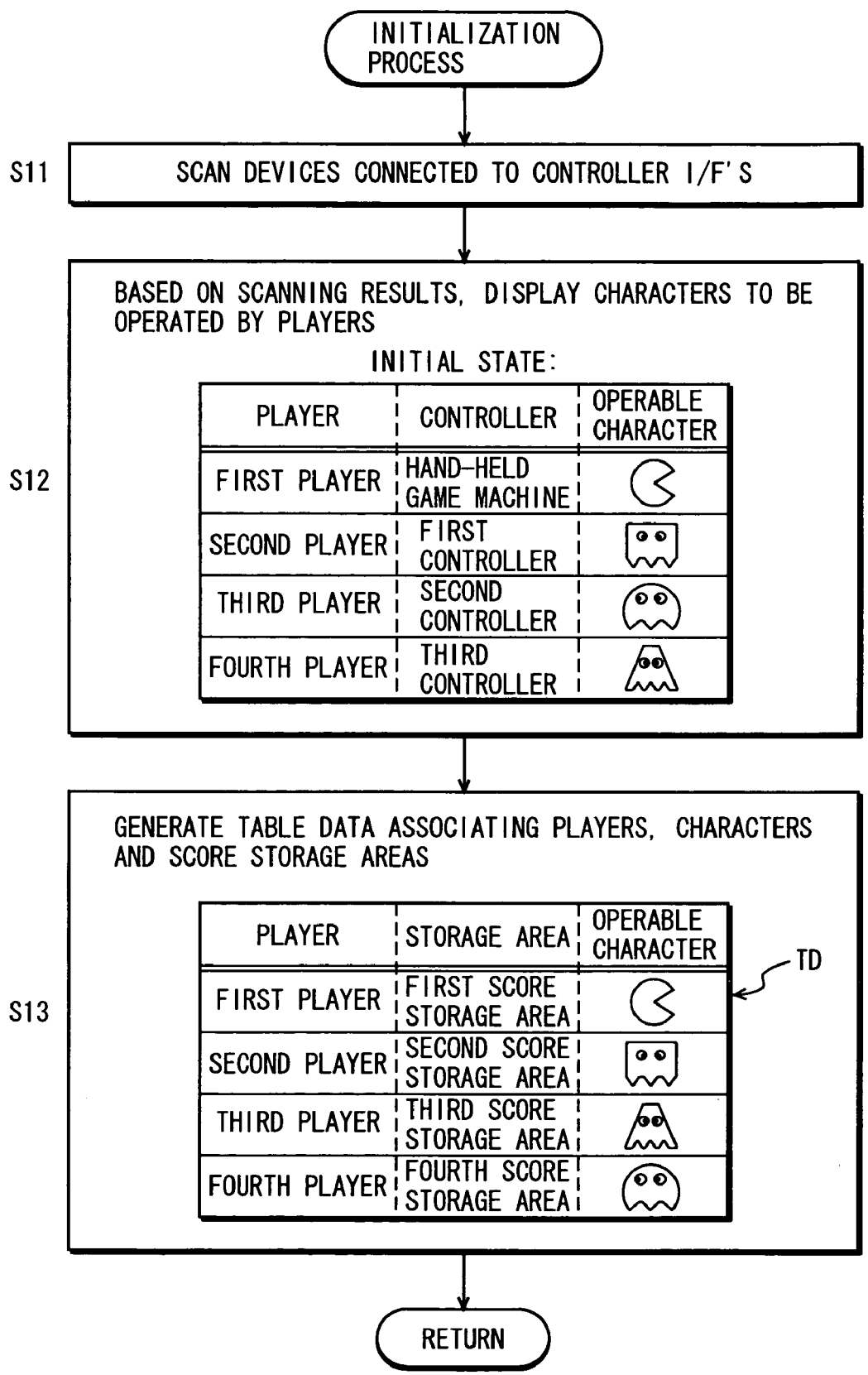
FIG. 15 is a flowchart illustrating an initialization process.
Figure 16:
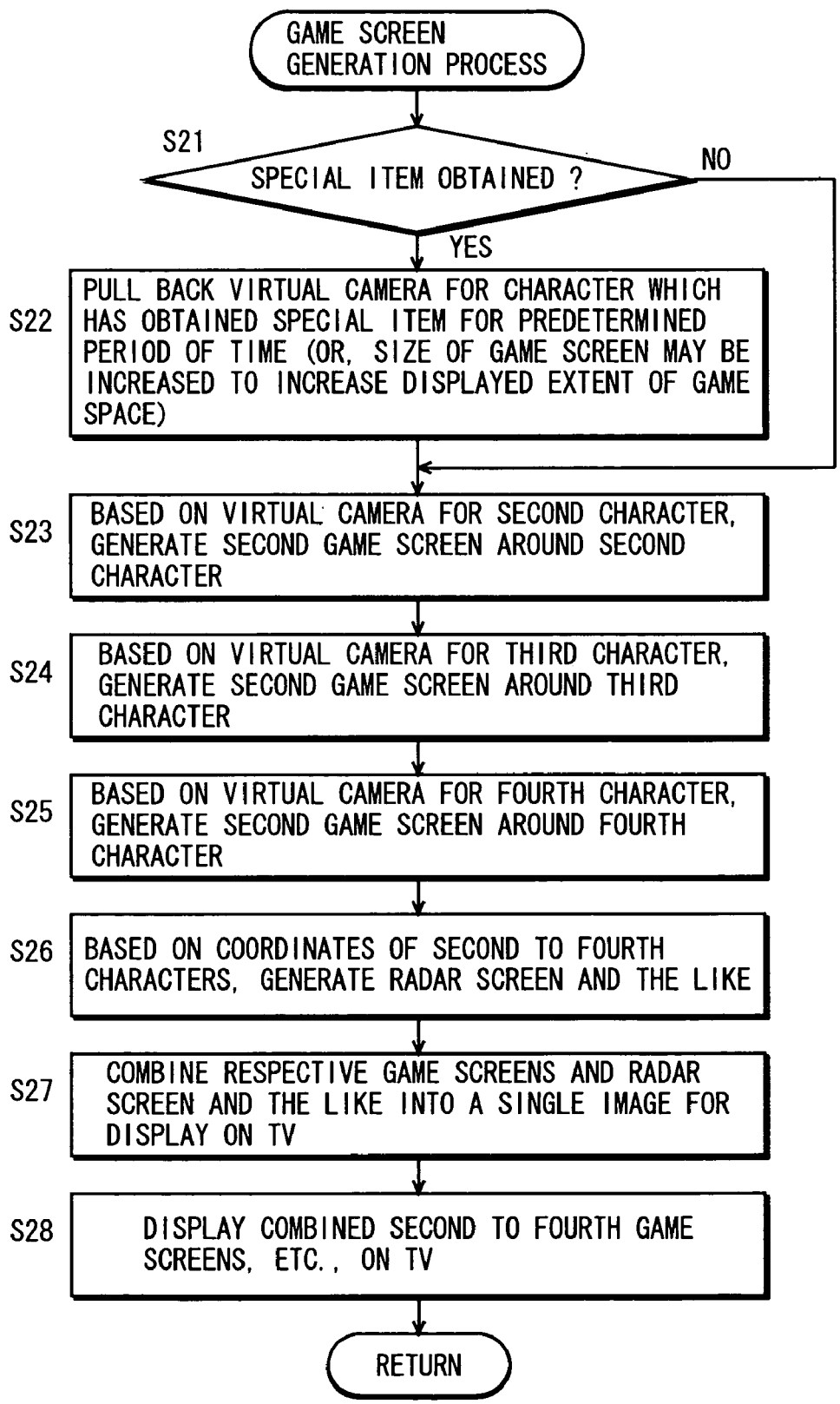
FIG. 16 is a flowchart illustrating a game screen generation process.
Figure 17:
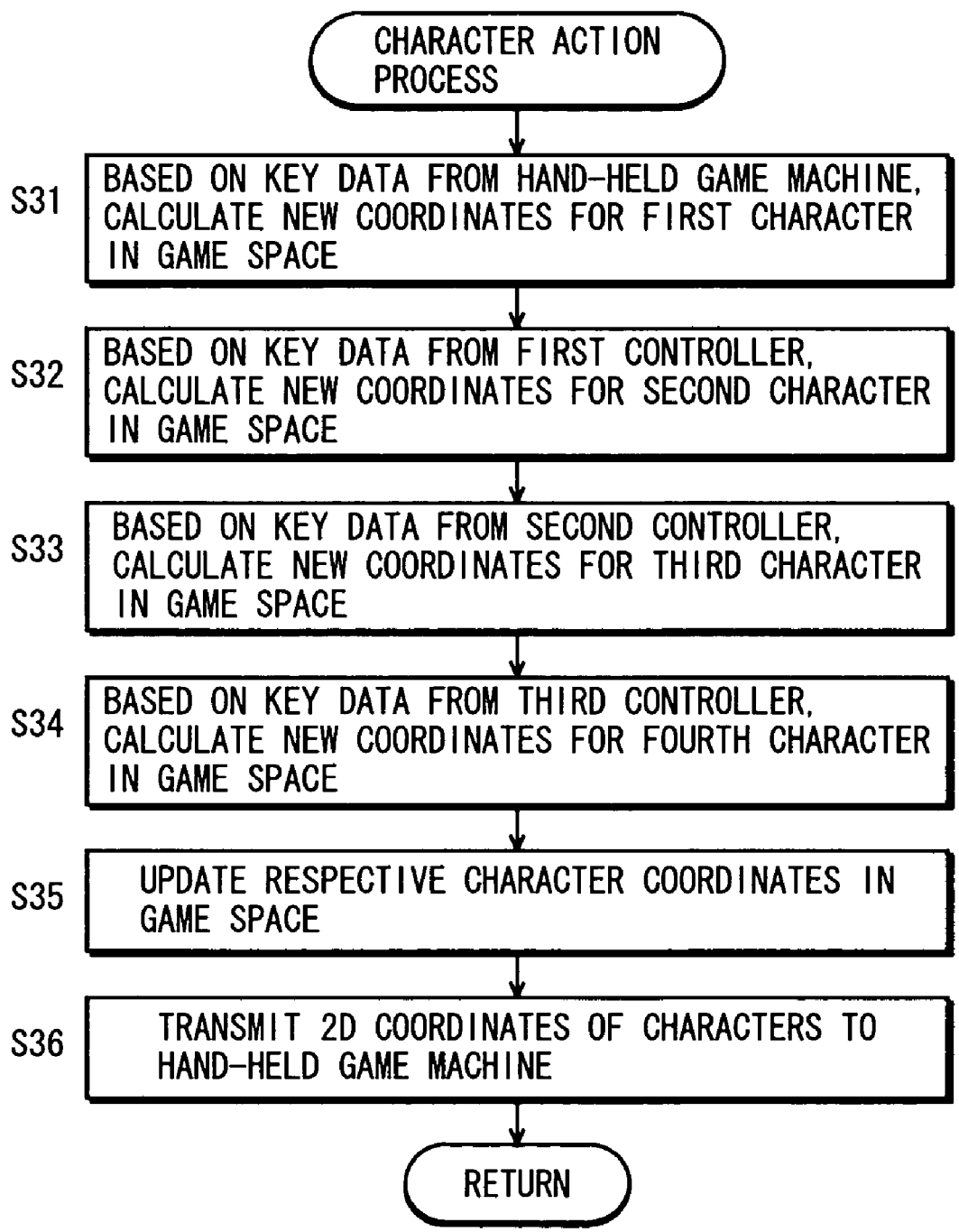
FIG. 17 is a flowchart illustrating a character action process.
Figure 18:
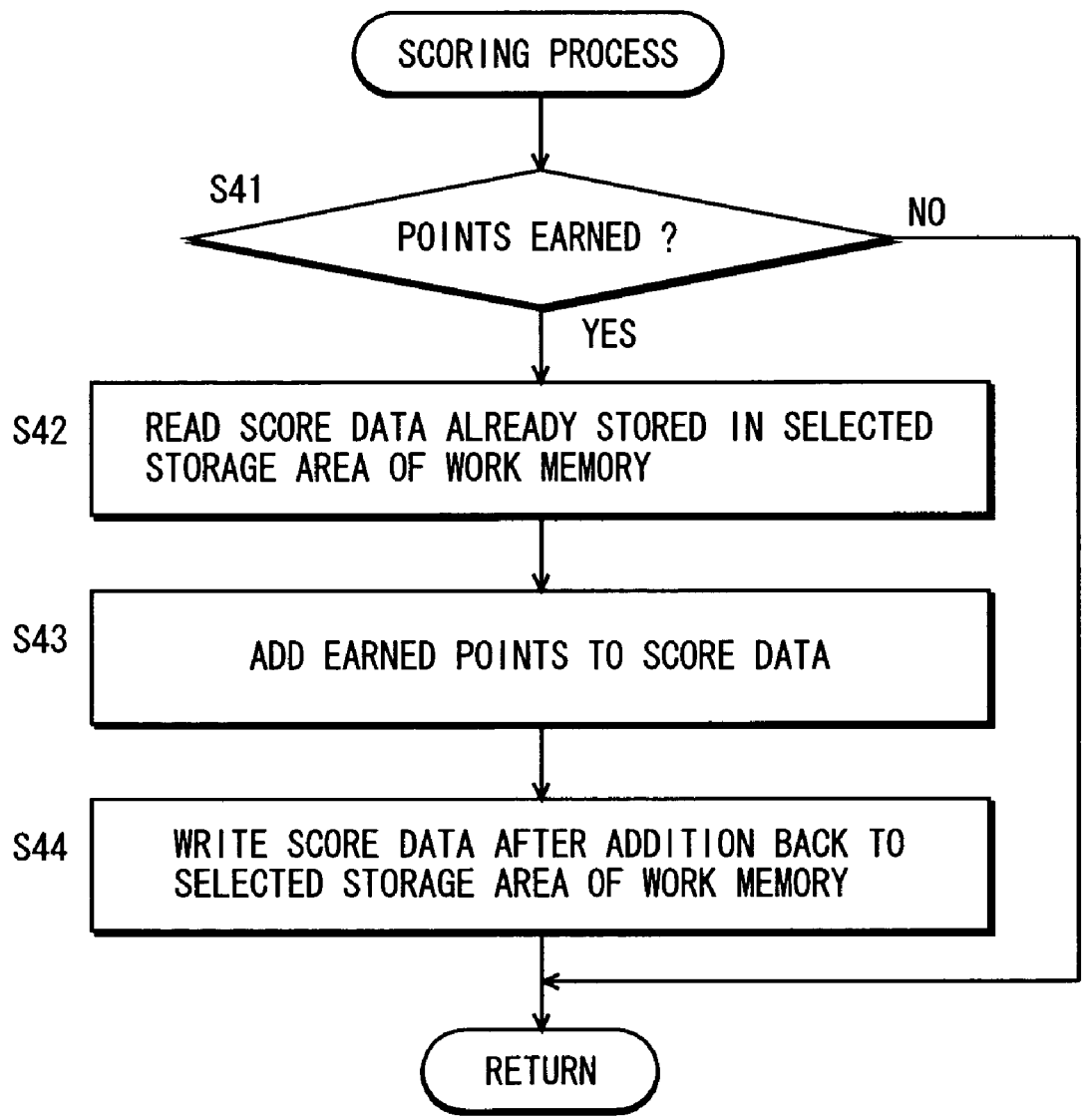
FIG. 18 is a flowchart illustrating a scoring process.
Figure 19:
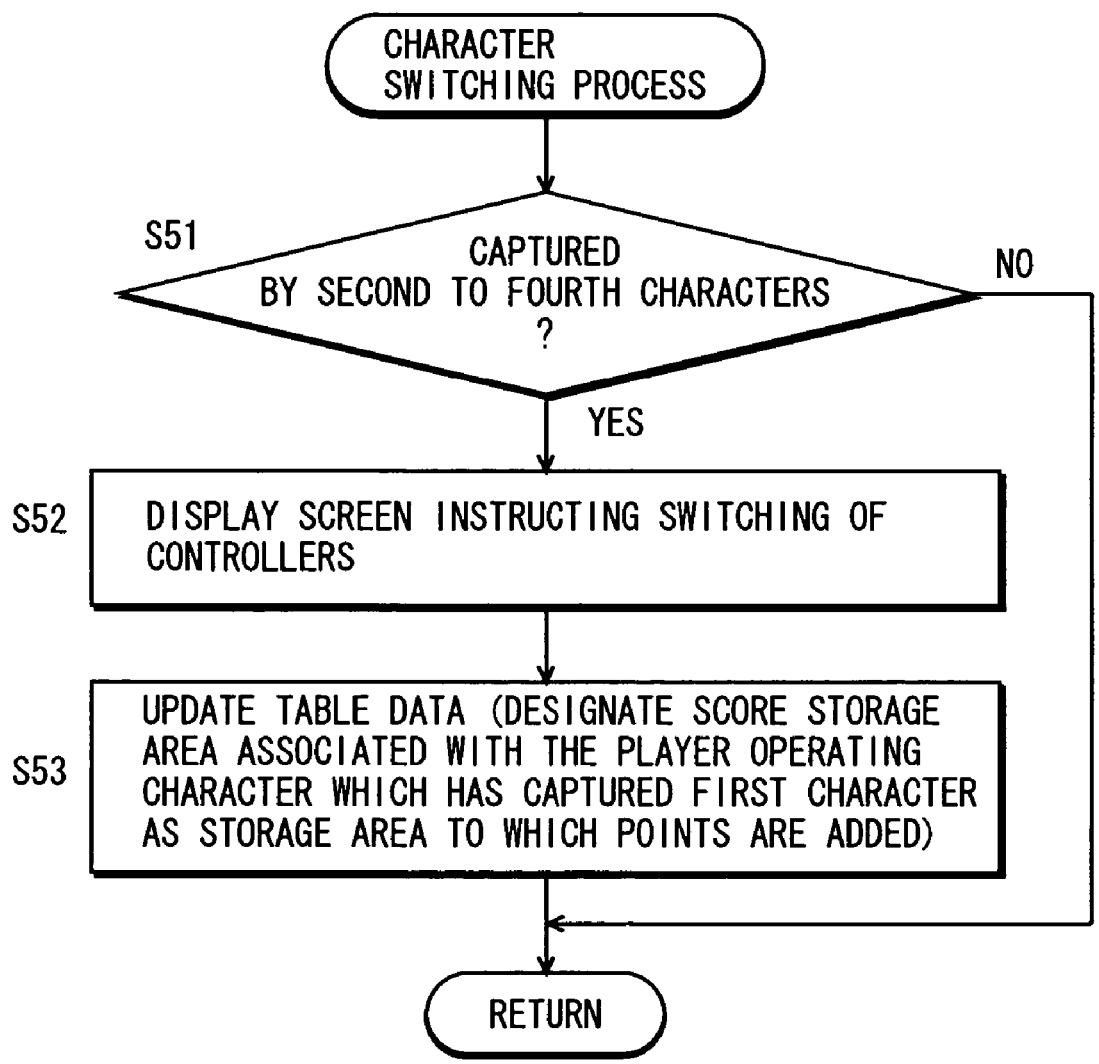
FIG. 19 is a flowchart illustrating a character switching process.

Hereinafter, the processes which are executed by a computer to embody the illustrative embodiments will be described with reference to the flowcharts of FIG. 13 to FIG. 19. FIG. 13 is a flowchart illustrating a process which is performed by the game program in the game device 3. FIG. 14 is a flowchart illustrating a process which is performed in the hand-held game machine 5. FIG. 15 is a flowchart illustrating an initialization process. FIG. 16 is a flowchart illustrating a game screen generation process. FIG. 17 is a flowchart illustrating a character action process. FIG. 15 is a flowchart illustrating a scoring process. FIG. 19 is a flow chart illustrating a character switching process.

First, when the player turns on the power of the game device 3, an operation program of the game device 3 (not shown) is activated, which reads at least part of the game program 40 on the optical disk 4 which is mounted and loads it to the work memory 32. On the other hand, when the power of the hand-held game machine 5 is turned on, a monitoring program (not shown) is activated, which confirms the presence or absence of the cartridge 59. Since there is no cartridge 59 attached, the monitoring program confirms whether there is any device connected to the communications port 58. Since the game device 3 is connected to the communications port 58, a negotiation can be performed via communications between the hand-held game machine 5 and the game device 3. Thereafter, if a start switch, etc., on a controller is pressed by a player, beginning of a game is instructed. As a result, the game program 40 begins to be executed, whereby the following steps are sequentially performed.

At step S1, the program for the hand-held game machine 48 is transmitted to the hand-held game machine 5. At step S2, an initialization process is performed. The initialization process is a process of assigning fixed first to fourth score storage areas 32a to 32d to the players, as will be described later in detail. Then, at step S3, a game space is generated. The generation of the game space is performed based on the map data 61, the character data 62, and the like, as has been described with reference to FIGS. 6A and 6B. At step S4, a game screen generation process is performed in accordance with the game screen output program 44. As has been described with reference to FIGS. 9A and 9B, the game screen generation process generates the first game screen W1, the second game screen W2, the third game screen W3, and the fourth game screen W4, on the basis of the game space generated at step S3. The game screen generation process will also be described later in more detail.

At step S5, in accordance with the operation detecting program 41, a key data detection is performed to ascertain what sort of operations have been made on the hand-held game machine 5 and the first to third controllers 6 to 8. At step S6, in accordance with the character operation program 43, a character action process for the first character C1 and the like is performed based on the key data, as will be described later in more detail. At step S7, in accordance with the score processing program 47, a scoring process of calculating points scored by the first character C1 is performed, as will be described later in more detail. At step S8, in accordance with the character switching program 42, a character switching process is performed, which will be valid if the first character C1 is captured by another character, as will be described later in more detail. Steps S4 to S8 are repeatedly executed until gameover is determined at step S9.

In the hand-held game machine 5, steps S91 to S96 shown in FIG. 14 are performed. At step S91, the hand-held game machine 5 receives the program for the hand-held game machine 48, which was transmitted at step S1, and begins executing this program. At step S92, key data in accordance with the manipulable element(s) that has been manipulated is transmitted to the game device 3. Based on the key data from the hand-held game machine 5 and the first to third controllers 6 to 8, coordinate data representing the three-dimensional positions of the first to fourth characters C1 to C4 in the 3D game space and coordinate data representing the two-dimensional positions of first to fourth characters C1 to C4 in the 2D game space are calculated by the game device 3. The 2D coordinate data is transmitted to the hand-held game machine 5. At step S93, the hand-held game machine 5 receives the above coordinate data. At step S94, based on the received coordinate data, the positions of the first to fourth characters C1 to C4 are updated. At step S95, a first game screen W1 is generated so as to contain the first to fourth characters C1 to C4 at their updated positions as well as the map M2, the point items I1, and the special item I2. At step S96, the first game screen W1 is displayed on the LCD 51. Steps S92 to S96 are repeatedly executed until gameover is determined at step S97.

Next, the initialization process will be described with reference to FIG. 15. First, at step S11, the devices which are connected to the controller I/F's 34a to 34d are scanned. Through this scanning, as shown in FIG. 1, the hand-held game machine 5 is detected on the controller I/F 34a corresponding to the leftmost controller port in FIG. 1; the first controller 6 is detected on the controller I/F 34b corresponding to the second controller port from the left; the second controller 7 is detected on the controller I/F 34c corresponding to the third controller port from the left; and the third controller 8 is detected on the controller I/F 34d corresponding to the fourth controller port from the left.

At step S12, settings are made to establish associations between the respective players, the respective controllers, and the respective characters. Specifically, the player operating the hand-held game machine 5 is designated as the first player and the operable character for the first player is set to be the first character C1; the player operating the first controller 6 is designated as the second player and the operable character for the second player is set to be the second character C2; the player operating the second controller 7 is designated as the third player and the operable character for the third player is set to be the third character C3; and the player operating the third controller 8 is designated as the fourth player and the operable character for the fourth player is set to be the fourth character C4.

At step S13, fixed first to fourth score storage areas are assigned to the first to fourth players. At this step S13, table data TD for associating the first to fourth players with the first to fourth score storage areas 32a to 32d, which are independently provided in the work memory 32 as shown in FIG. 8A or 8B corresponding to the respective players, is generated. By referring to this table data TD, it becomes possible to know which player is operating which character, and hence which of the first to fourth score storage areas 32a to 32d the points scored by the first character C1 should be added to.

Next, with reference to FIG. 16, the game screen generation process will be described. First, at step S21, it is determined whether the special item I2 has been obtained by any of the second to fourth characters C2 to C4. If any of the second to fourth characters C2 to C4 has obtained the special item I2, as already described with reference to FIGS. 11A and 11B, step S22 is performed to broaden the displayed extent in the game screen corresponding to the character which has obtained the special item I2. At this step S22, the virtual camera corresponding to the character which has obtained the special item I2 is pulled back (i.e., placed farther away from the character). For example, by pulling the virtual camera V2 shown in FIG. 6A away from the third character C3, the displayed extent provided by the virtual camera V2 is broadened, so that the surroundings of the third character C3 in the third game screen W3 can be seen in a broader area, as shown in FIG. 11B. On the other hand, if step S21 finds that the special item I2 has not been obtained by any of the second to fourth characters C2 to C4, control proceeds to the next step S23 without performing the process of step S22.

At step S23, the CPU 32 generates a second game screen W2 for displaying an area substantially centered around the second character C2, based on the virtual camera V1 corresponding to the second character C2. At steps S24 and S25, a third game screen W3 and a fourth game screen W4 are similarly generated. Furthermore, at step S26, a radar screen W5 is generated which contains the second to fourth characters C2 to C4 deployed over the 2D map M2. Although omitted from detailed illustration in the present illustrative embodiment, processes for generating a score window W6 for displaying the points stored in the score storage area, a remaining time window W8 for displaying the remaining time for the game, and a remaining point items window W7 for displaying the remaining number of point items I1 are also performed. At step S27, these game screens and windows are combined so as to be able to be displayed as a single image on the TV 2. At this step S27, the second game screen W2 and the like may be arranged so as to fit within a predetermined display frame. Then, at step S28, the second to fourth game screens W2 to W4 as well as the radar screen W5 and the like are displayed on the TV 2 (see FIG. 9B).

Next, the character action process shown in FIG. 17 will be described. At step S31, based on the key data received from the hand-held game machine 5, new coordinates for the first character C1 in the game space are calculated. This new coordinate data includes both 3D coordinate data corresponding to the 3D map M1 and 2D coordinate data corresponding to the 2D map M2. At step S32, based on the key data received from the first controller 6, new coordinates for the second character C2 are calculated. At step S33, based on the key data received from the second controller 7, new coordinates for the third character C3 are calculated. Furthermore, at step S34, based on the key data received from the third controller 8, new coordinates for the third character C3 are calculated. At step S35, based on the new coordinates calculated at steps S31 to S34, positions of the characters C1 to C4 on the map M1 and the map M2 are updated. At this time, the positions of the respective characters in the second game screen W2, the third game screen W3, the fourth game screen W4, and the radar screen W5 are updated. Then, at step S36, the coordinate data of the characters C1 to C4 on the 2D map M2 is transmitted to the hand-held game machine 5. As described above, the positions of the respective characters in the first game screen W1 are updated based on the transmitted coordinate data. As a result, the respective characters in the first game screen W1 and the respective characters in the second to fourth game screens W2 to W4 are displayed in appropriate positions, while maintaining synchronization between the screens.

Next, the scoring process, which is performed in accordance with the score processing program 47, will be described with reference to FIG. 18. First, at step S41, it is determined whether the first character C1 has earned any points. Specifically, if overlapping between the first character C1 and a point item I2 is detected, it is determined that some points have been earned. Then, at step S42, among the first to fourth score storage areas 32a to 32d in the work memory 32, the score data stored in the score storage area which is selected for the first character C1 (i.e., associated with the first character C1) is read. Referring to the example shown in FIG. 8A, the table data TD is accessed, and the score data stored in the first score storage area 32a ("0" in the illustrated example) is read. Then, at step S43, the earned score data is added to the read score data. At step S44, the score data after the addition is written back to the score storage area. As a result, points are added to the player operating the first character C1 only while the player is operating the first character C1. On the other hand, if step S41 finds that no points have been earned, the processes of steps S42 to S44 are not performed, so that the score data stored in the first to fourth score storage areas 32a to 32d is not changed.

Next, the character switching process, which is performed in accordance with the character switching program 42, will be described with reference to FIG. 19. First, at step S51, it is determined whether the first character C1 has been captured by any of the second to fourth characters C2 to C4. Specifically, if any one of the second to fourth characters C2 to C4 overlaps with the first character C1, it is determined that the first character C1 has been captured by the overlapping character. At step S52, a screen instructing switching of controllers is displayed. Specifically, as shown in FIG. 7B, a screen indicating that the first character C1 has been captured by the second character C2 is first displayed, followed by the screen instructing switching of controllers shown in FIG. 7C. Then, the table data TD is updated at step S53. Specifically, at step S53, the operable character for the first player is set to the second character C2 and the operable character for the second player is set to the first character C1 in the table data TD. As a result, the storage area to which points are added is switched from the first score storage area 32a to the second score storage area 32b. At this time, the second to fourth game screens W2 and the like as shown in FIG. 10 are displayed on the TV 2. Thereafter, the second player operates the first character C1 with the hand-held game machine 5 so as to earn points, whereas the first, third, and fourth players seek to capture the first character C1, which now is being operated by the second player. On the other hand, if step S51 finds that the first character C1 has not been captured by any of the second to fourth characters C2 to C4, the processes of step S52 and S53 are not performed.

According to the above-described embodiment, one hand-held game machine and a plurality of controllers are employed in a manner which provides an additional twist to the game in that controllers and the hand-held game machine (which is higher in value than the mere controllers) are exchanged between players as if chess pieces or cards. Moreover, the field of view within the game space is changed in size depending on the character, thus creating advantages and disadvantages in the game progression. There is also an economical merit in that a game system which is constructed as illustrated in the above embodiment can be realized by means of a single game device (with three controllers) and a single hand-held game machine for four players to participate. Although the above embodiment illustrates an example where the first character and the second character are simply exchanged, the first player may alternatively be forced to operate a totally different fifth character when the first player has allowed the first character to be captured by the second character, for example. Although the entire game space is displayed in the first game screen according to the above embodiment, the extent to be displayed in the first game screen only needs to be broader than that displayed in any of the second to fourth game screens.

Figure 20:
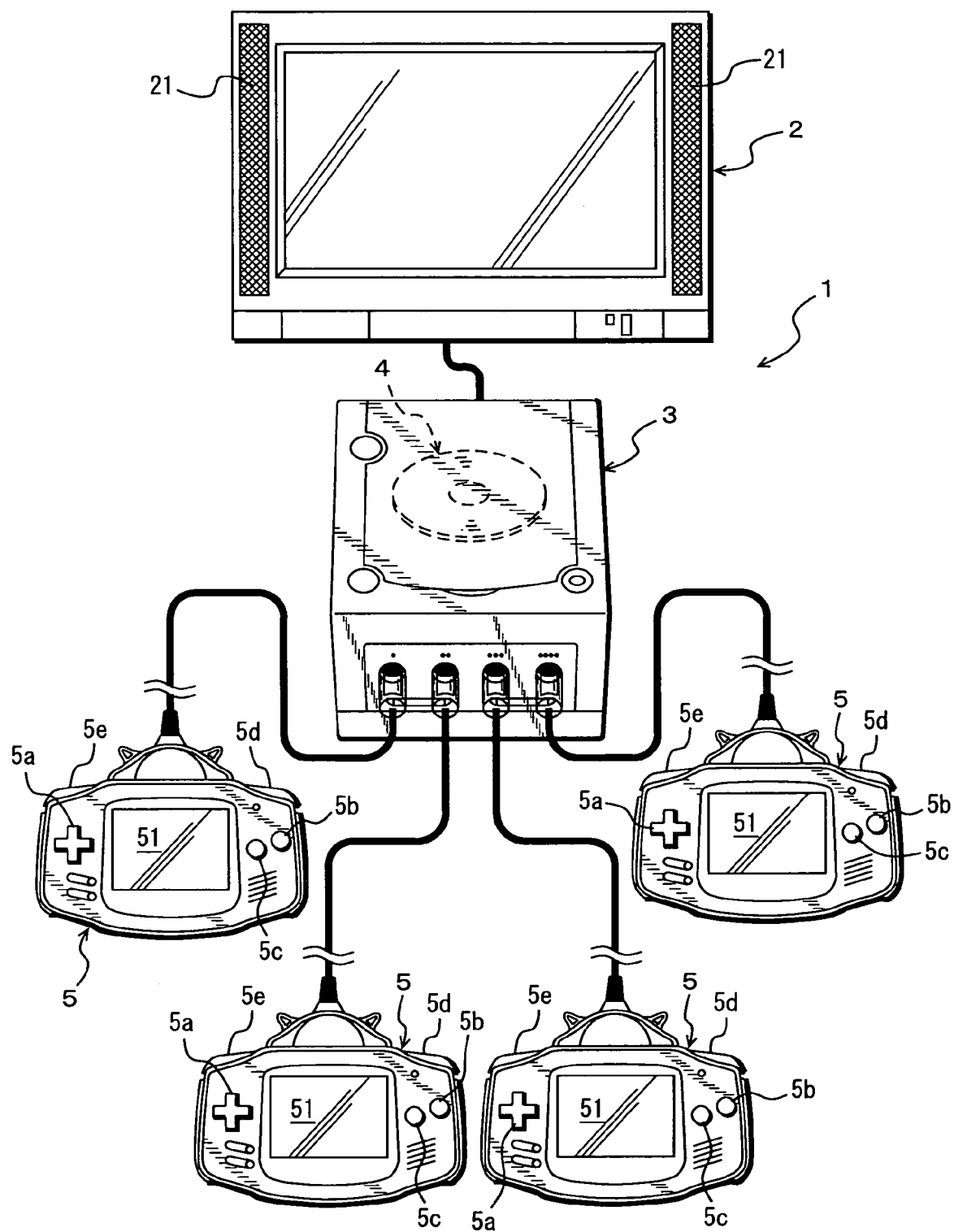
FIG. 20 is a general view of a game system which is constructed from a plurality of hand-held game machines and a game device.

Although the embodiment illustrates an example where one hand-held game machine 5 and three controllers 6 to 8 are connected to the game device 3, three hand-held game machines 5 may alternatively be connected to the game device 3 instead of three controllers 6 to 8, as shown in FIG. 20. In this case, a first game screen as shown in FIG. 21A may be displayed on the LCD 51 of the hand-held game machine 5 held by the player operating the first character C1, while a screen as shown in FIG. 21B may be displayed on the LCD's 51 of the hand-held game machines 5 of the other players. In particular, it is preferable that the screen exemplified in FIG. 21B displays an image of the character that is being operated by each player. It may be ensured that the displayed character makes a certain motion when it approaches the first character C1, thereby letting the player know that the first character C1 is near. Based on the construction illustrated in FIG. 20, the trouble of physically exchanging between a hand-held game machine 5 and controllers 6 to 8 for operating the first character C1 can be avoided.

Figure 22:
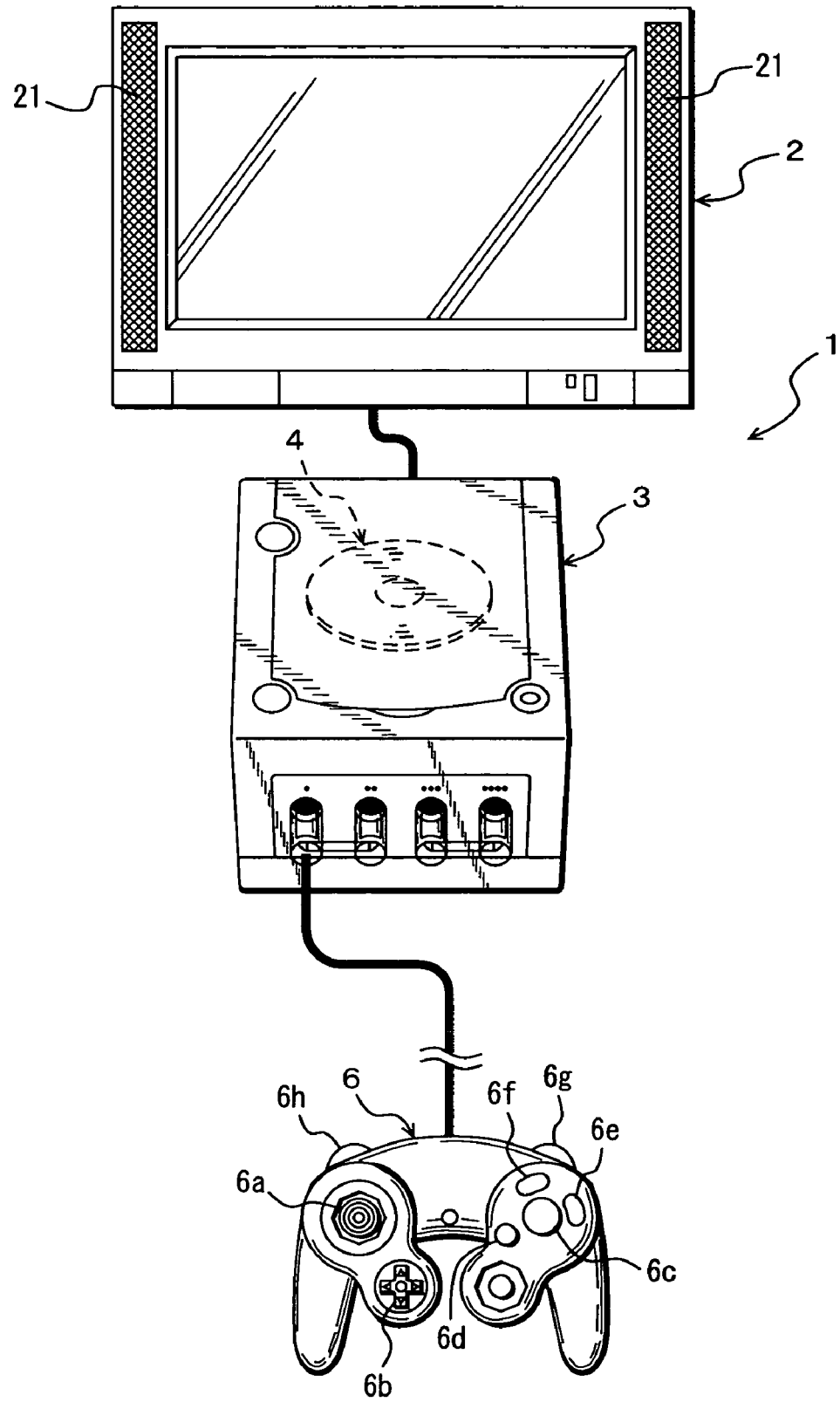
FIG. 22 is a general view of a game system which is constructed from a single controller and a game device.
Figure 23A:
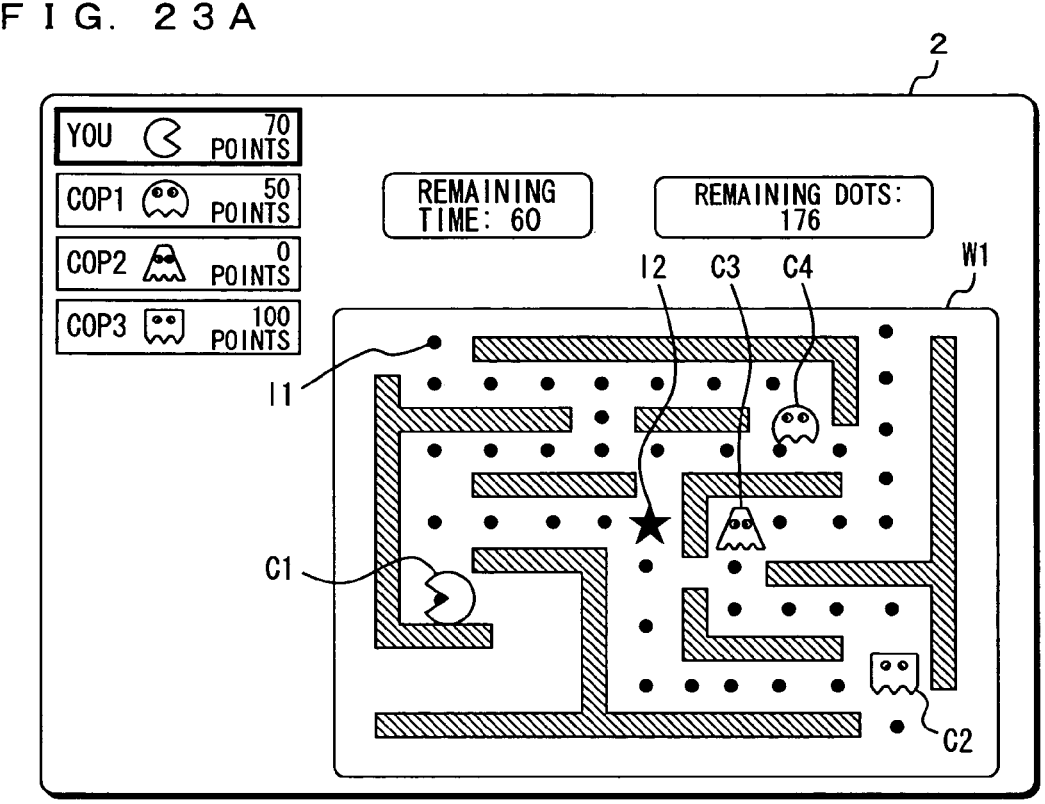
FIG. 23A is a diagram illustrating an exemplary first game screen displayed by the game device shown in FIG. 22.
Figure 23B:
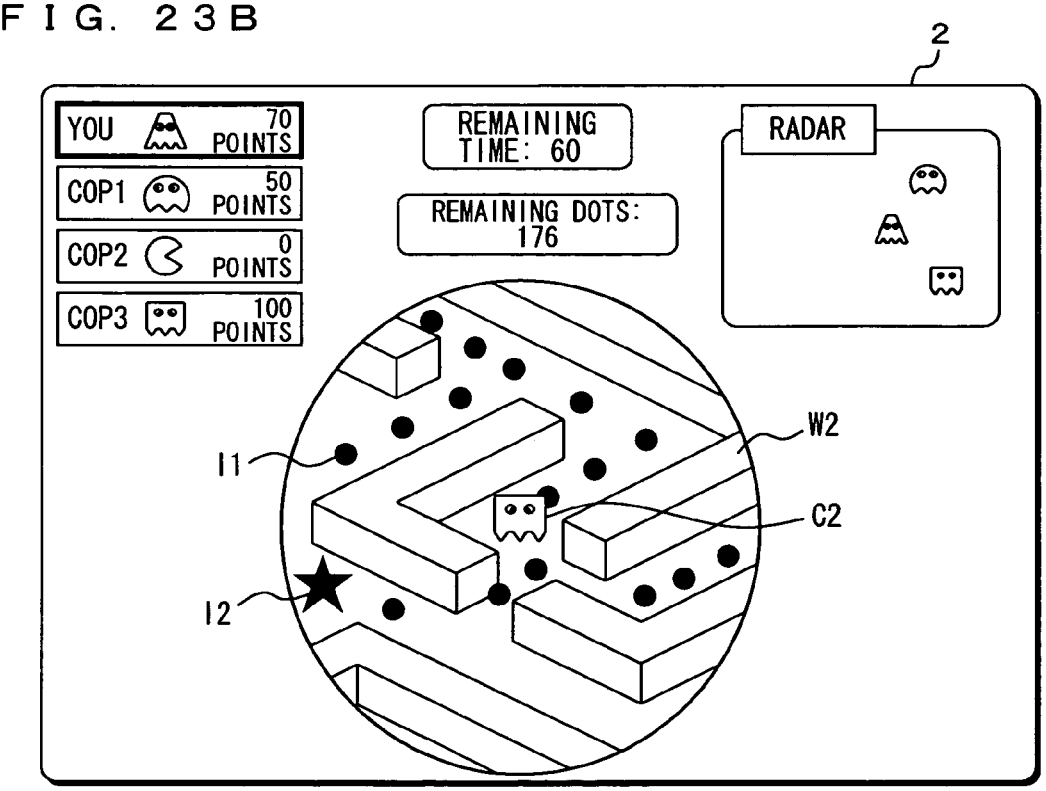
FIG. 23B is a diagram illustrating an exemplary second game screen displayed by the game device shown in FIG. 22.

Furthermore, the illustrative embodiments are also applicable to a game device to which a single controller is connected, as shown in FIG. 22. FIG. 22 shows a general view of the game system 1. FIGS. 23A and 23B are diagrams illustrating an exemplary first game screen and an exemplary second game screen to be displayed on the TV 2, respectively. In the following descriptions, those constituent elements which have already been described in the above embodiment will be denoted by like numerals, and the descriptions thereof are omitted.

As shown in FIG. 22, the game system 1 includes a TV 2 and a game device 3. A single controller 6 is connected to the game device 3. The player operates the first character C1 or the like by using the controller 6. Any character other than the character operated by the player is automatically operated by a previously-provided program. The program for automatically controlling the other (second to fourth) characters C2 to C4 may be programmed so that the characters C2 to C4 will behave based on a displayed extent provided in a second (third, fourth, etc.) game screen as described above; thus, the same level of handicaps can be provided for the characters C2 to C4 as if they were operated by human players. On the other hand, while the player is operating the first character C1, a first game screen W1 is displayed on the TV 2 as shown in FIG. 23A. If the computer-operated second character C2 captures the first character C1, the first player will operate the second character C2 in a second game screen W2 as shown in FIG. 23B. Thus, even in a situation where there is only one player, different extents of game space are displayed depending on the character, whereby a more interesting game can be provided which involves different levels of controllability depending on the character. The detailed processes to be performed in this variant will be readily understood from the flowcharts illustrated in FIG. 13 to FIG. 19, and the descriptions thereof are omitted. Moreover, a plurality of game devices 3 may be connected via a LAN or the like in a manner to enable communications therebetween, thus constructing a network game system. In this case, too, a first game screen may be presented to the player who is operating the first character, and a second game screen may be presented to the player who is operating a second character, and so on, such that the game screens are appropriately switched as the characters are switched.

The illustrative embodiments are also applicable to a network game system which is constructed from a plurality of terminals that are connected via a network. As shown in FIG. 24, such a network game system is constructed from a server 11 which is connected to the Internet 10 (as an example of a network), and a plurality of user terminals 12. The server 11 exerts an overall control over the key data, coordinate data, and the like which are sent from the respective terminals 12. Each user terminal 12 includes a display device, which displays the aforementioned first game screen W1 or the second game screen W2, etc., depending on the operable character for that user terminal 12.

Figure 25A:
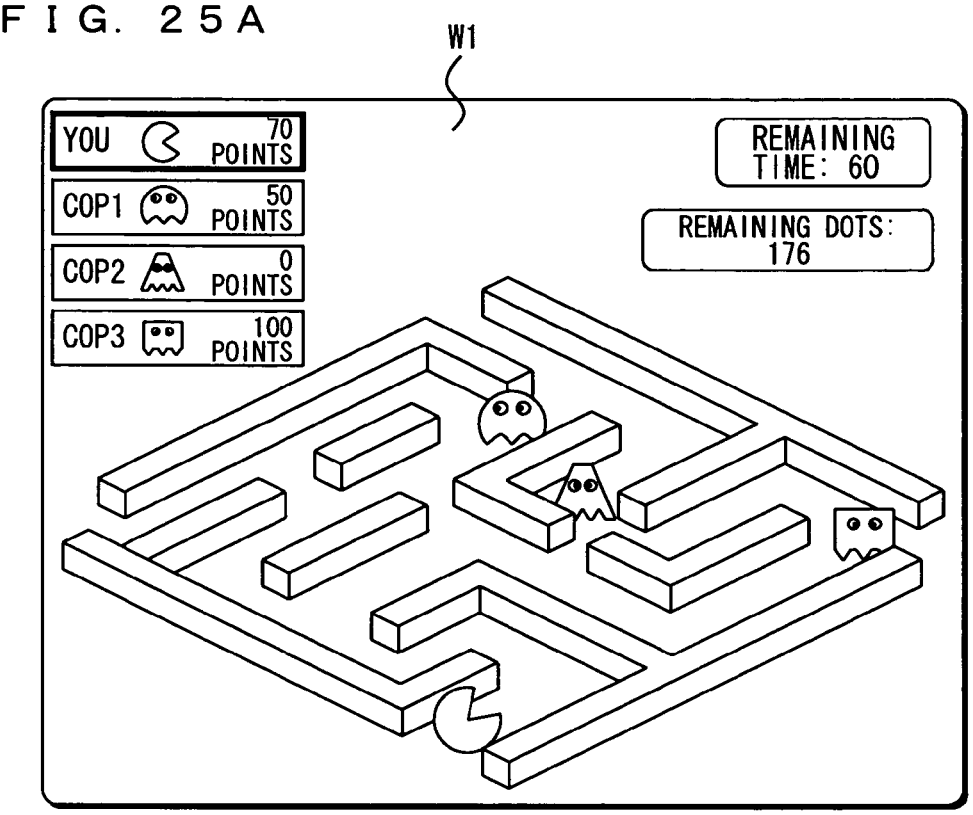
FIG. 25A is a diagram illustrating an exemplary first game screen displayed on a terminal device.
Figure 25B:
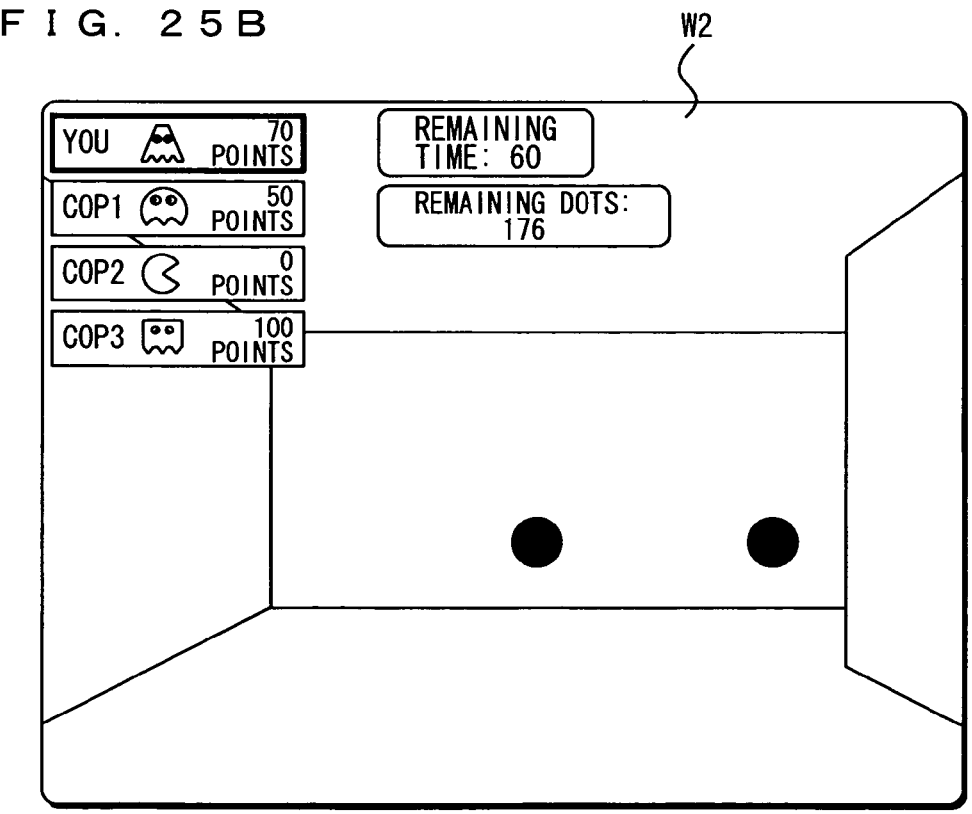
FIG. 25B is a diagram illustrating an exemplary second game screen displayed on a terminal device.
Figure 26A:
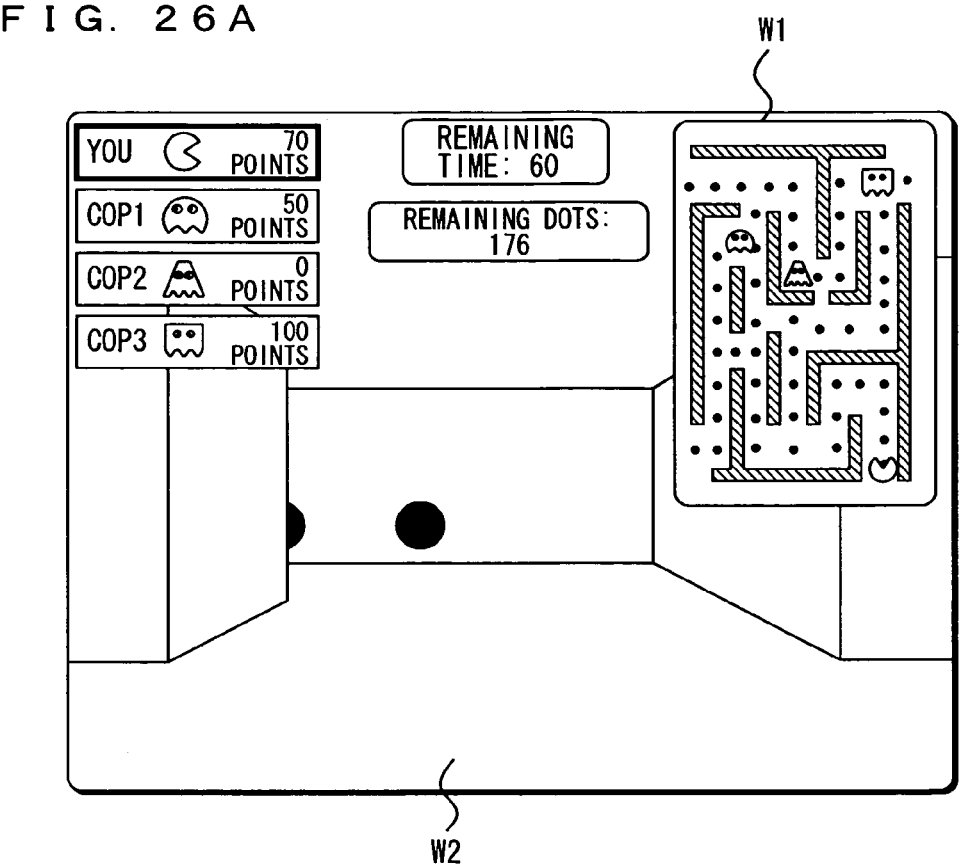
FIG. 26A is a diagram illustrating exemplary first and second game screens displayed on a terminal device.
Figure 26B:
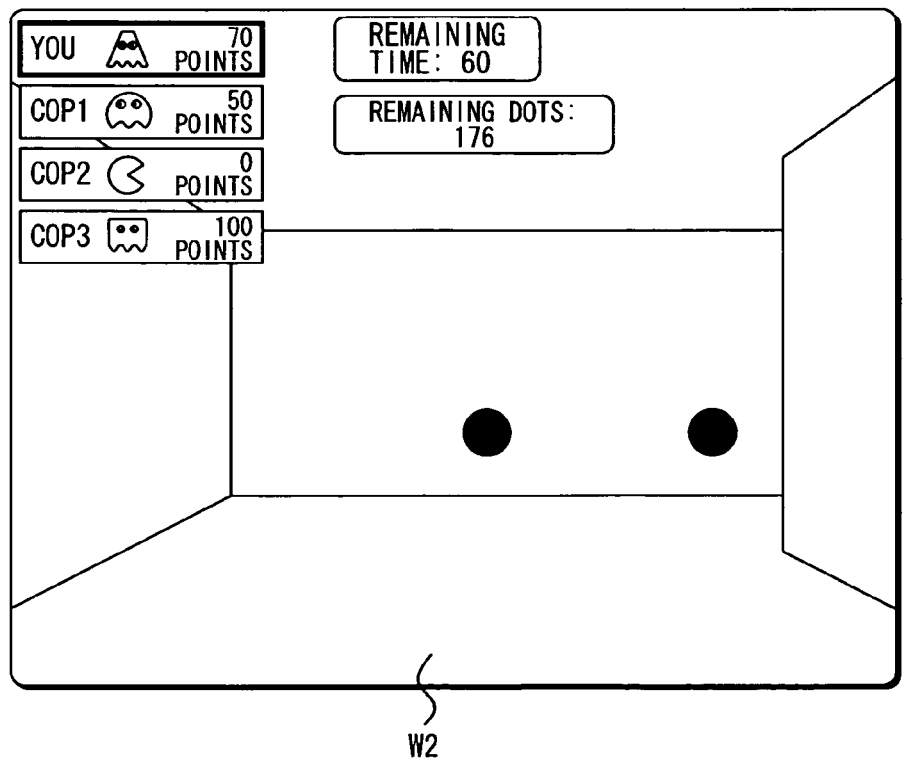
FIG. 26B is a diagram illustrating an exemplary second game screen displayed on a terminal device.

Each user terminal 12 may display a first game screen or a second game screen as shown in FIGS. 25A and 25B, respectively, or FIGS. 26A and 26B, respectively. FIG. 25A shows an exemplary first game screen which provides a three-dimensional representation of a game space. FIG. 25B shows an exemplary second game screen which represents the game space from a first-person viewpoint (i.e., from the character's viewpoint). In accordance with this construction, only a very limited range is displayed in the second game screen, so that greater differences in controllability can be provided between different characters. As further illustrated in FIG. 26A and FIG. 26B, a second game screen from a first-person viewpoint may always be displayed, with the first game screen being additionally turned on when the player becomes able to operate the first character.

While the invention has been described in detail, the foregoing description is in all aspects illustrative and not restrictive. It is understood that numerous other modifications and variations can be devised without departing from the scope of the invention.

The invention claimed is:

1. A video game system including at least one operation device which a player manipulates to control a particular game character, the game system outputting to a display device a game screen image presenting one or more game characters, at least one of which is controllable using the operation device, comprising:

at least one map storage memory for storing map data used to display a game space;

at least one character storage memory for storing game character data of at least a first character and a second character different from the first character, said first and second character being separately controllable using the operation device;

operation detection programmed logic circuitry configured to detect manipulation made by a player to the operation device;

character switching programmed logic circuitry configured to detect when a first predetermined game condition is satisfied and change a game character controlled by the operation device between one of at least said first character and said second character upon detecting that said first predetermined game condition is satisfied;

first character operation programmed logic circuitry configured to control the first character in accordance with manipulation made to the operation device when the character switching programmed logic circuitry selects the first character as the particular game character to be controlled by the operation device;

first game screen output programmed logic circuitry configured to output to a display device a first game screen image presenting a full-extent field of view of the game space containing the first game character and other game characters;

second character operation programmed logic circuitry configured to control the second character in accordance with manipulation made to the operation device when the character switching programmed logic circuitry selects the second character as the particular game character to be controlled by the operation device;

second game screen output programmed logic circuitry configured to output to a display device a second game screen image presenting a narrow-extent field of view of the game space centered about the second game character and, at the same time, a narrow-extent field of view centered about each other player-controlled game character, if any, other than said first character, wherein different extents of a field of view of the game space are displayed depending on a predetermined handicap assigned to each player-controlled game character;

a common display device having a display screen that is viewable by several players, said common display device displaying said second game screen image; and at least one personal display device for individual use by a single player, said personal display device displaying said first game screen image.

2. The game system according to claim 1, wherein the personal display device is associated with a first operation device used by a first player; and a second operation device is used by a second player; and wherein when the first predetermined condition is satisfied, the first game screen output programmed logic circuitry outputs the first game screen image to the personal display device.

3. The game system according to claim 2, wherein the first operation device comprises a hand-held game machine apparatus which includes the personal display device and at least one manipulable element with which to control the first character.

4. The game system according to claim 3, further comprising a plurality of second operation devices to be operated by a plurality of second players, wherein the second game screen output programmed logic circuitry outputs to the common display device said second game screen image presenting a plurality of narrow-extent views corresponding to respective player-controlled game characters individually controllable using the plurality of second operation devices, the plurality of narrow-extent views depicting different respective game space field of views that do not overlap one another.

5. The game system according to claim 2, further comprising:
score storage memory including a first score storage and a second score storage;
table generation/update programmed logic circuitry configured to generate table data representing associations between the first score storage, the first player, and a game character operable by the first player, and table data representing associations between the second score storage, the second player, and a game character operable by the second player, and to update table data associations when the character switching programmed logic circuitry switches game characters controllable by an operation device;
score adding programmed logic circuitry configured to cumulatively add score points each time the first character scores points; and
score writing programmed logic circuitry configured to write points added by the score adding programmed logic circuitry to the first score storage, by referring to the table data, when the first player is associated with the first character, and to write points added by the score adding mechanism to the second score storage when the second player is associated with the first character.

6. The game apparatus according to claim 2, wherein the second game screen output programmed logic circuitry also outputs a radar screen image on at least a portion of the common display device for displaying a graphic indication of a relative position of the first character and the second character as they exist within the entire game space, the radar screen image being displayed together with the second game screen image on the common display device.

7. The game system according to claim 1, further comprising residual image display control programmed logic circuitry configured to display, after the first character has passed through a game space depicted in a narrow-extent view presented in a second game screen image, a residual artifact image along a trajectory of the first character for a predetermined period of time.

8. The game system according to claim 1, further comprising:
display region changing programmed logic circuitry configured to enlarge, during a predetermined period of time after a second predetermined game condition is satisfied, the narrow-extent field of view surrounding the second character presented in second game screen image so as to encompass a broader extent of the game space than that provided in said narrow-extent field of view surrounding the second character.

9. A video game system computer configured under control of a game program executable by a computer, said video game system including a common display device having a display screen that is viewable by several players, at least one personal display device for use by an individual player and one or more game operation control devices with which a player manipulates to control a particular game character, the game program including instructions for configuring the computer to output to one or more display devices a game screen image depicting one or more game characters which are controlled by one or more players using the game operation control devices, comprising:
character switching programmed logic circuitry configured to detect when a first predetermined game condition is satisfied and change a game character controlled by an operation device between one of at least a first game character and a second game character upon detecting that said first predetermined condition is satisfied;
first game screen output programmed logic circuitry configured to output to a display device a first game screen image presenting a full-extent field of view of the game space containing the first game character and other game characters; and
second game screen output programmed logic circuitry configured to output to a display device a second game screen image presenting a narrow-extent field of view of the game space centered about the second game character and, at the same time, a narrow-extent field of view centered about each other player-controlled game character, if any, other than said first character; and
display device programmed logic circuitry configured to simultaneously provide said second game screen image to said common display device and said first game screen image to a single personal display device.

10. The video game system according to claim 9, wherein a first operation device is used by a first player and a second operation device distinct from the first operation device used by a second player distinct from the first player, and further comprising:
character switching programmed logic circuitry configured to switch a game character controlled by the first player with a game character controlled by the second player when the first predetermined condition is satisfied;
first game screen output programmed logic circuitry configured to output the first game screen image to a personal display device; and
second game screen output programmed logic circuitry configured to output the second game screen image to the common display device.

11. The video game system according to claim 10,
wherein the first operation device comprises a hand-held game machine including a personal display device and at least one manipulable element with which to control a game character, and
first game screen output programmed logic circuitry outputs the first game screen image to the personal display device of the hand-held game machine.

12. The video game system according to claim 10, wherein the game program causes the second game screen output programmed logic circuitry to also output to the common display device a radar screen image that provides an indication of a relative position of the first character and the second character within the entire game space, the radar screen image being displayed together with the second game screen image on the common display device.

13. The video game system according to claim 9 further comprising a plurality of second operation devices to be operated by a plurality of second players,
wherein the game program causes the computer to function so that the second game screen output programmed logic circuitry also outputs to the common display device a plurality of narrow-extent field of view images corresponding to respective second game characters that are controlled via the plurality of second operation devices, the plurality of images depicting different respective narrow-extent game space field of views that do not overlap one another.

14. The video game system according to claim 9, further comprising residual image display control programmed logic circuitry which, after the first character has passed through a game space depicted in a second game screen image, displays a residual artifact image along a trajectory of the first character for a predetermined period of time.

15. The video game system according to claim 9, further comprising display region changing programmed logic circuitry which, for a predetermined period of time after a second predetermined game condition is satisfied, changes the narrow-extent field of view within the second game screen image so as to present a broader extent field of view of the game space surrounding the second character than that provided in said narrow-extent field of view.

16. The video game system according to claim 9, further comprising:
   score storage memory including a first score storage and a second score storage;
   table generation/update programmed logic circuitry configured to generate table data representing associations between the first score storage, the first player, and a game character operable by the first player, and table data representing associations between the second score storage, the second player, and a game character operable by the second player, and to update table data associations when the character switching programmed logic circuitry switches game characters controllable by an operation device;
   score adding programmed logic circuitry configured to cumulatively add score points each time the first character scores points; and
   score writing programmed logic circuitry configured to write points added by the score adding programmed logic circuitry to the first score storage when the first player is associated with the first character, and to write points added by the score adding mechanism to the second score storage when the second player is associated with the first character, by referring to the table data.

17. The video game system according to claim 9, wherein different extents of a field of view of the game space are displayed depending upon a predetermined handicap assigned to each player-controlled game character.

18. A game system for playing a multiplayer network game including a network server computer and a plurality of terminal devices coupled to a network, each terminal device including an operation mechanism with which a player operates a game character and a display device, the network server computer exerting overall control over the network game and game screen images provided to each terminal, said network server computer comprising:
   a map storage memory for storing map data used to display a game space;
   a character storage memory for storing game character data of at least a first character and a second character different from the first character, said first and second character being separately controllable using different operation mechanisms;
   operation detection programmed logic circuitry configured to detect manipulation made by a player to the operation mechanism;
   character switching programmed logic circuitry configured to detect when a first predetermined game condition is satisfied and change a game character controlled by the operation mechanism between one of said first character and said second character upon detecting that said first predetermined game condition is satisfied;
   first character operation programmed logic circuitry configured to control the first character in accordance with manipulation made to the operation mechanism when the character switching programmed logic circuitry selects the first character as the particular game character to be controlled by the operation mechanism;
   first game screen output programmed logic circuitry configured to output to a single terminal display device a first game screen image presenting a full-extent field of view display of the entire playable game space showing the first character and at least one or more other game character;
   second character operation programmed logic circuitry configured to control the second character in accordance with manipulation made to the operation mechanism when the character switching programmed logic circuitry selects the second character as the particular game character to be controlled by the operation mechanism;
   second game screen output programmed logic circuitry configured to output to a different terminal display device a second game screen image presenting a narrow-extent field of view encompassing only a small portion of the playable game space as seen from the second game character's viewpoint within the game space,
   wherein each terminal device display device displays either the first game screen image or the second game screen image, each having different extents of a field of view of the game space, depending on a predetermined handicap associated with the particular game character that is being controlled at the terminal device.

19. The game system according to claim 18, wherein different extents of a field of view of the game space are displayed depending upon a predetermined handicap assigned to each player-controlled game character.

20. The game system according to claim 18, wherein the second game screen output programmed logic circuitry also outputs a radar screen image on at least a portion of the terminal display device for displaying a graphic indication of a relative position of the first character and the second character as they exist within the entire game space, the radar screen image being displayed together with the second game screen image on the common display device.

21. The game system according to claim 18, wherein the first game screen output programmed logic circuitry also outputs a three-dimensional representation of the full-extent of the game space on at least a portion of the terminal display device for displaying relative positions of the game characters as they exist within the entire game space.

* * * * *